US009313643B1

(12) United States Patent
Ghoshal et al.

(10) Patent No.: US 9,313,643 B1
(45) Date of Patent: Apr. 12, 2016

(54) DYNAMIC SUBSCRIBER IDENTITY MODULE

(71) Applicant: Sprint Communications Company L.P., Overland Park, KS (US)

(72) Inventors: Jagannath Ghoshal, Olathe, KS (US); Robert L. Spanel, Overland Park, KS (US); Bret D. Sumner, Lawrence, KS (US); Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/619,677

(22) Filed: Feb. 11, 2015

(51) Int. Cl.
  *H04W 8/02* (2009.01)
  *H04W 8/22* (2009.01)
  *H04W 60/04* (2009.01)
  *H04W 4/00* (2009.01)
  *H04W 8/24* (2009.01)
  *H04W 88/06* (2009.01)

(52) U.S. Cl.
  CPC ............... *H04W 8/02* (2013.01); *H04W 4/003* (2013.01); *H04W 8/22* (2013.01); *H04W 60/04* (2013.01); *H04W 8/245* (2013.01); *H04W 88/06* (2013.01)

(58) Field of Classification Search
  CPC ....... H04W 8/02; H04W 4/003; H04W 8/245; H04W 88/06
  See application file for complete search history.

(56) References Cited

U.S. PATENT DOCUMENTS

| 2014/0099916 | A1* | 4/2014 | Mallikarjunan | H04W 8/20 455/406 |
| 2014/0342715 | A1* | 11/2014 | Gu | G06F 9/455 455/418 |
| 2015/0017962 | A1* | 1/2015 | Howard | H04W 8/22 455/418 |

* cited by examiner

Primary Examiner — Barry Taylor

(57) ABSTRACT

A method provides dynamically changing a mobile communication device by communicative coupling with a dynamic subscriber identity module (SIM). The method comprises identifying, via a communication transceiver, a mobile communication network that corresponds with one carrier sub-partition of a carrier partition of the mobile communication device. The method polls an identification of an active carrier applet from the dynamic SIM, one carrier applet of a plurality being the active carrier applet. Responsive to a trigger event, one carrier sub-partition changes dynamically to another carrier sub-partition, each corresponding with a different wireless communication identity. The corresponding wireless communication identity is activated based on confirming the identification of the active carrier applet is associated with the corresponding wireless communication identity. The mobile communication device conducts wireless communication coupling based on the activated corresponding wireless communication identity and active carrier applet of the dynamic SIM.

20 Claims, 11 Drawing Sheets

DYNAMIC SUBSCRIBER IDENTITY MODULE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may be used as a business device, for example in support of a person's role as an employee of a corporation, or as a personal communication device, for example in support of a person's role as a private individual. Mobile communication devices are prevalently used both internationally and locally. These devices are supported by wireless communications carriers that provide coverage for calls originating in a local area. When a user of a mobile device subscribing to a plan in a country travels to a different locality, the user may desire to use a carrier in the region of travel for a period of time. Alternately, the user may enter a roaming agreement that their current carrier has with another carrier internationally.

SUMMARY

In an embodiment, a method of dynamically changing a mobile communication device by communicative coupling with a dynamic subscriber identity module (SIM) is disclosed. The method comprises identifying, via a communication transceiver of the mobile communication device that is executing at least one processor, a mobile communication network that corresponds with at least one of a plurality of carrier sub-partitions of a carrier partition in a non-transitory memory of the mobile communication device. The method includes polling, by the mobile communication device from the dynamic SIM executing at least one logical processor and that is removably engaged with the mobile communication device, an identification of an active carrier applet on the dynamic SIM. One of a plurality of carrier applets is the active carrier applet. In response to a trigger event, the mobile communication device changes dynamically from one carrier sub-partition to another carrier sub-partition. At least the one carrier sub-partition and the another carrier sub-partition each correspond with a different wireless communication identity. The method includes confirming, by the mobile communication device based on the dynamic SIM, that the identification of the active carrier applet is associated with the corresponding wireless communication identity that is unique to the another carrier sub-partition. Based on the confirmation, the method further activates the corresponding wireless communication identity of the another carrier sub-partition based on the confirmation. The method includes conducting wireless communication coupling with the mobile communication network via the communication transceiver of the mobile device based on the activated corresponding wireless communication identity and the active carrier applet of the dynamic SIM.

In another embodiment, a method of dynamically changing a mobile communication device by communicative coupling with a dynamic subscriber identity module (SIM) is disclosed. The method comprises identifying a mobile communication network via a communication transceiver of the mobile communication device executing at least one processor. The mobile communication network is one of a plurality of mobile communication networks and is associated with a wireless communication identity. The method polls, by the mobile communication device from the dynamic SIM that is removably engaged with the mobile communication device, an identification of an active carrier applet on the dynamic SIM. The active carrier applet is a first carrier applet stored in one of a plurality of memory partitions of the dynamic SIM. The method further includes switching the active carrier applet on the dynamic SIM from the first carrier applet to another carrier applet. The another carrier applet stored in another of the plurality of memory partitions of the dynamic SIM is associated with the identified mobile communication network. Based on switching the active carrier applet to another carrier applet, the method further analyzes whether a corresponding carrier sub-partition is in a carrier partition of a non-transitory memory of the mobile communication device. The corresponding carrier sub-partition is associated with the wireless communication identity. The method further includes that responsive to an analysis that the wireless communication identity is not associated with any corresponding carrier sub-partition, allocating, by the mobile communication device, one of a plurality of carrier sub-partitions in the carrier partition to the wireless communication identity. The method also comprises conducting wireless communication coupling with the mobile communication network via the communication transceiver of the mobile device based on the carrier sub-partition allocated to the wireless communication identity and the active carrier applet that is another carrier applet of the dynamic SIM.

In another embodiment, a method of dynamically changing a mobile communication device by communicative coupling with a dynamic subscriber identity module (SIM) is disclosed. The method comprises identifying a mobile communication network via a communication transceiver of the mobile communication device that is executing at least one processor. The mobile communication network is one of a plurality of mobile communication networks and is associated with a wireless communication identity. The method includes establishing, by the mobile communication device with the dynamic SIM that is removably engaged with the mobile communication device, that an identification of an active carrier applet on the dynamic SIM is associated with the identified mobile communication network. The active carrier applet refers to one of a plurality of carrier applets on the dynamic SIM. The method further comprises changing dynamically, on the mobile communication device based at least on the identification of the active carrier applet, from one carrier sub-partition to another carrier sub-partition of the plurality of carrier sub-partitions in the carrier partition. The another carrier sub-partition corresponds at least with the wireless communication identity associated with the identified mobile communication network. The method further includes accessing, by the mobile communication device, a predefined set of user communication parameters used at least by the one carrier sub-partition prior to dynamically changing to the another carrier sub-partition. The method comprises conducting wireless communication coupling with the mobile communication network via the communication transceiver of the mobile device based on the other carrier sub-partition, the active carrier applet of the dynamic SIM, and the accessed predefined set of user communication parameters.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
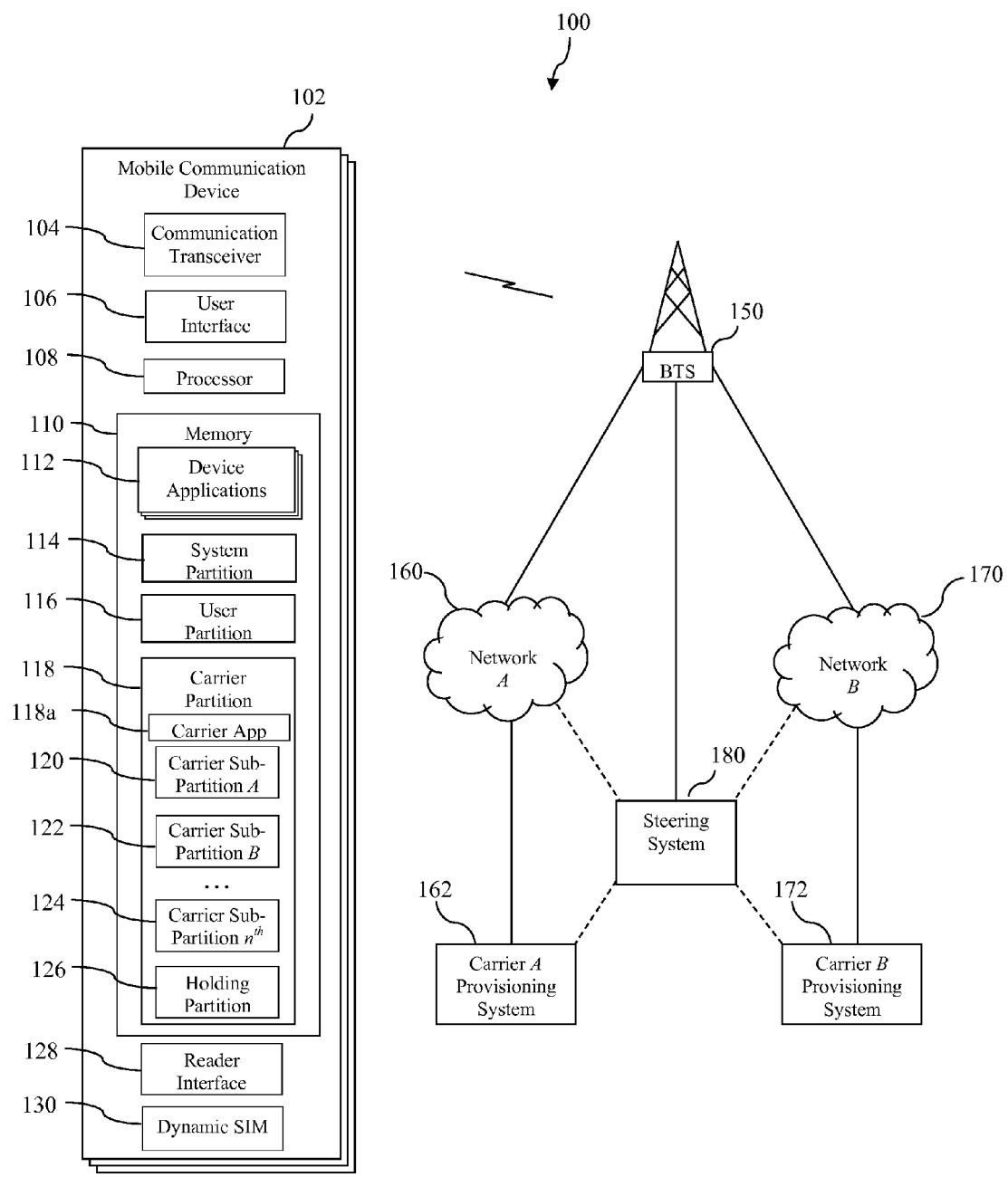
FIG. 1A is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

During vacations or business travel, users may desire to connect their mobile communication device to a wireless communication network operated by another wireless carrier that is not native to the user. However, users may become frustrated by imposed roaming charges for being a visitor on the other wireless network, thus making it difficult for the other wireless carrier to establish a positive relationship with the traveler. Problems may be caused by a mobile communication device that is associated with one single wireless communication identity, despite the user desiring to transition smoothly to another wireless carrier and use a different wireless communication identity on the other wireless network while continuing to use the same device. The problems may result from conventional physical universal integrated circuit cards (UICC) and subscriber identity module (SIM) cards. For example, conventional physical, removable UICC and SIM cards typically contain information that is loaded and pre-associated with one user subscription to a carrier in order to conform to various industry standards. Additionally, the mobile device using a conventional UICC and/or SIM card is limited to interactions with the wireless carrier(s) originally associated with the information on the conventional cards. This means that a traveler would have to remove the conventional SIM card and take the time to find a local retailer to obtain a new conventional card for native service with carriers unassociated with information currently configured on the conventional card.

Said in other words, conventional cards are typically statically configured for use with one or two wireless carriers and this configuration requires reflashing the entire memory of the conventional card with new information in order to change information on the conventional card after the user obtains the mobile communication device. Thus, installing, updating, and/or provisioning conventional cards typically overwrites, disturbs, and/or temporarily erases the parameters and information related to carriers stored in the memory of the conventional card. Thus, when a user desires different wireless communication identities on their mobile device with different wireless carriers, different locations, different user preferences, or different services, a conventional SIM card used with a static wireless communication identity may not be satisfactory. Therefore, the present disclosure teaches a system and method for dynamically changing a mobile communication device by using a communicatively coupled dynamic subscriber identity module (dynamic SIM) card.

A dynamic SIM is a physically removable smart card that may be removably engaged with the mobile device, while also being able to interact (through the use of a carrier applet that is activated on the dynamic SIM) with a carrier network which adheres to industry standards for operation. This allows a user to have and access multiple subscriptions for a plurality of wireless carriers through the use carrier applets on the dynamic SIM. More specifically, the user may be concurrently subscribed to and concurrently provisioned to receive wireless communication service in different networks or with different service providers. The dynamic SIM allows for switching subscriptions for wireless carriers without user input, while also enabling selective installing and/or updating for a particular subscription without having to overwrite or disturb the particular memory on the dynamic SIM with information associated with other carriers and subscriptions.

For example, a wireless carrier associated with a particular brand may gain partnerships with multiple wireless carriers (domestic and/or foreign) each operating under a different brand to provide user access that allows enrollment and subscriptions with any or all of the wireless carriers and their associated brand, irrespective of the geographic location. A user's mobile communication device would retrieve, receive, install, and/or activate wireless communication identities that are each allocated and stored into a different partition of memory of the mobile communication device through an application. The user's mobile communication device is connected with a dynamic SIM that has a plurality of carrier applets each stored in a separate memory partition on the dynamic SIM. Each carrier applet has unique identifying information (such as at least a unique serial number) that corresponds with a particular wireless carrier, particular subscription account for a carrier, and/or particular wireless communication identity on the mobile communication device. The mobile device may refer to a particular carrier applet on the dynamic SIM and retrieve, install, activate, and/or switch to the corresponding wireless communication identity for that carrier and wireless subscription for the user. The dynamic SIM has one carrier applet active at any time, while also maintaining storage of a plurality of other carrier applets associated with different carriers, accepting over-the-air installation of new carrier applets for new subscriptions with carriers, and have provisioning installed for one particular carrier applet without affecting or disturbing the information and content of other carrier applets on the dynamic SIM.

Thus, a person may operate their mobile device for personal use with a domestic carrier, with the mobile device operating, customized, and branded according to a corresponding personal wireless communication identity and carrier applet of the dynamic SIM. When the person travels abroad with the dynamic SIM in their mobile device, (e.g., the user traveling to England for business purposes), a trigger event is detected by an application on the mobile device and/or dynamic SIM. Trigger events may vary and include user input, the change of locations, the change of available wireless communication services providers, a received signal transmission incident, a scheduled event, switching of active carrier applets on the dynamic SIM, or another triggering event identified on the mobile device. Based on the trigger event, the mobile device dynamically changes to an optimal, preferred, and/or improved setting for functioning on a particular network by changing carrier sub-partitions, which in turn activates a corresponding wireless communication identity (e.g., a business identity). Activating the wireless communication identity will correspond with dynamically switching an associated carrier applet that is active and stored on the dynamic SIM. One wireless communication identity is active at any time, but if the corresponding carrier applet is not loaded into (or loaded but not activated on) the dynamic SIM, then a carrier application may initiate a process that allows the dynamic SIM to obtain the associated carrier applet for the network and load (and/or dynamically switch) the carrier applet on the dynamic SIM without user involvement, and without affecting and/or disturbing other carrier applets on the dynamic SIM.

Thus the user experiences a smooth transition in using a different carrier network with another wireless communication identity. This also allows the British carrier to brand, customize, and optimize the operational efficiency of the user's mobile device when using the British carrier's network through specific run-time parameters. In addition to the user avoiding roaming fees with the British carrier (due to the mobile device using the carrier applet on the dynamic SIM that is associated with the British carrier), the user's personal wireless communication identity and associated carrier applet remains stored and unaffected. The mobile communication device changes to accommodate user data associated with the wireless communication identity while the mobile device is interacting with the British carrier's network (such as configuring the mobile device according to user preferences, service enrollment, application enablement, customization parameters, branding information, and/or a contact list). Corresponding applications on the mobile device may then operate with updated user data as well based on use in the particular carrier's network. Furthermore, if the user decides to buy a new mobile communication device while traveling abroad from one of the partnered carriers, the user can simply insert the dynamic SIM from their old mobile device into the new mobile device, and the new mobile communication device will identify this and obtain the wireless communication identities associated with that user. Thus, the robust and dynamic changing of the mobile device enables a user to subscribe to multiple carriers and choose to receive the appropriate experience, both domestically and abroad.

Figure 1B:
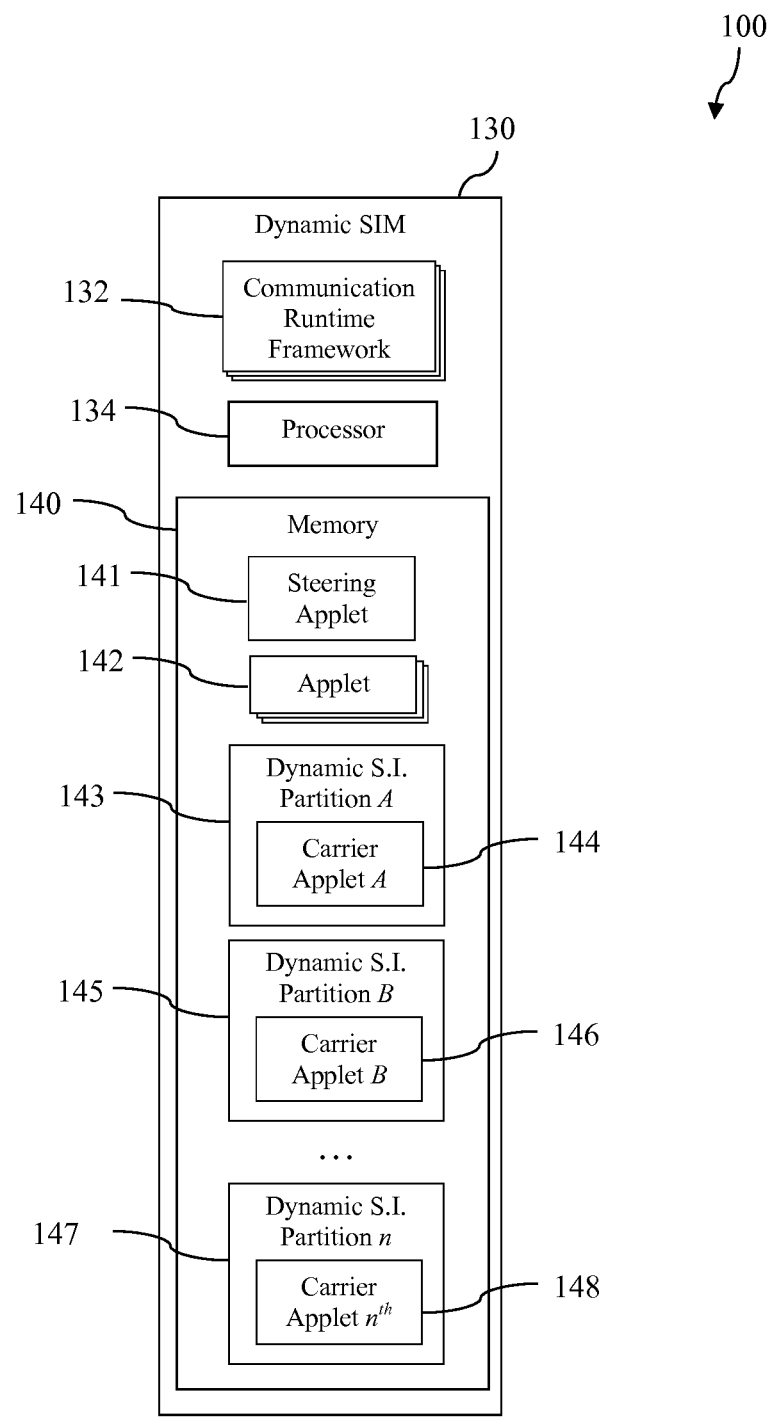
FIG. 1B is an illustration of an element of the communication system of FIG. 1A according to an embodiment of the disclosure.

Turning now to FIG. 1A and FIG. 1B, a communication system 100 is described. In an embodiment, the system 100 comprises a plurality of mobile communication devices 102. The mobile communication device 102 may comprise a radio frequency communication transceiver 104 (occasionally referred to herein as a communication transceiver), a user interface 106, at least one processor 108, and a non-transitory memory 110. The memory 110 may comprise a system partition 114, a user partition 116, and a carrier partition 118. The carrier partition 118 may include a plurality of carrier sub-partitions, such as carrier sub-partition A 120, carrier sub-partition B 122, and continuing through a designated carrier sub-partition N 124. Additionally, the memory 110 may comprise a holding partition 126 that stores and/or transfers information that may be commonly shared between any of the carrier sub-partitions 120, 122, 124 and/or the system partition 114, or user partition 116. The memory 110 may comprise device applications 112 and at least one trusted security zone that may be apportioned into a plurality of partitions. In some embodiments, a specific partition of memory 110 may be a trusted security zone and may comprise a plurality of sub-partitions that may each be separate and distinct trusted security zones. It is understood that a memory partition and/or sub-partition that is a trusted security zone may occasionally be referred to as a trusted secure partition. A further discussion of trusted security zones is provided below.

The mobile communication device 102 is configured to use the communication transceiver 104 to establish a wireless communication link with a base transceiver station (BTS) 150, and the BTS 150 provides communications connectivity of the mobile communication device 102 to at least one network, such as any of Network A 160 and/or Network B 170. A BTS is a network access node that that should not be limited to a particular communication technology, and thus reference to a BTS includes a NodeB and/or eNodeB along with their associated controllers. A plurality of servers and/or systems may also have access and communicative coupling to one of the networks such as 160 and/or 170. It is understood that the networks 160 and 170 may comprise any combination of private and public networks. Additionally, while each of the networks 160, 170 are illustrated as separate clouds in FIG. 1A, it is understood that different networks may share some network nodes and/or infrastructure. Likewise, while the BTS 150 is illustrated as one device, it is understood that considered as an element or package of functionality, the BTS 150 may be embodied as a first BTS functionality associated with the network A 160 and a second BTS functionality associated with the network B 170.

As illustrated in FIG. 1A, networks 160 and 170 represent separate carrier networks that are associated with the carrier sub-partition A 120 and carrier sub-partition B 122 respectively. It is understood that there may be multiple networks that may connect to a carrier sub-partition (and a corresponding wireless communication identity) having the appropriate network configuration to access the corresponding network. Additionally, it is understood that, in some embodiments, a plurality of communication service providers (carriers) may be associated with a particular network infrastructure that is owned and/or operated by one communication service provider. For instance, Mobile Virtual Network Operators (MVNO) are organizations that provide mobile communication services but may not have their own licensed frequency allocation of radio spectrum or the physical infrastructure required to provide wireless telephone services. Mobile virtual network operators may contract to distribute wireless services provided by telecommunications service providers that have licensed frequency and physical infrastructure. Mobile virtual network operators function as distributors of wireless services and may set their own pricing structures. For example, in FIG. 1A, a first communication service provider may have built and/or maintained network A 160, while a second communication service provider may lease a part of network A 160 for providing communication services for the second provider and thus designate this leased portion of network A 160 as network B 170. Accordingly, in this example, the second communication service provider may be considered a MVNO for network B 170 by leasing and/or using a portion of network A 160 that is associated with the first communication service provider.

It is understood that the system 100 may comprise any number of mobile communication devices 102 and any number of base transceiver stations (e.g., 150). The collectivity of BTSs 150 may be said to comprise a radio access network, in that these BTSs 150 may provide a radio communication link to the mobile communication devices 102 to provide access to a network, such as any of network A 160 and/or network B 170. The radio access network may be abstracted in different ways and may comprise, in addition to the BTSs 150, servers and data stores that may implement functionality of home location registers (HLRs), visitor location registers (VLRs), base station controllers (BSCs), mobile switching centers (MSCs), and/or other network nodes that are specifically associated with providing wireless access and connectivity to the mobile communication devices 102.

The communication transceiver 104 may communicate with the BTS 150 using any of a variety of wireless communication protocols including, but not limited to, a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The mobile communication device 102 may be any of a mobile phone, a personal digital assistant (PDA), a media player, a wireless enabled computer, a headset computer, a wearable computer, or other mobile communication device. In an embodiment, the mobile communication device 102 may have other components (not shown) such as a near field communication (NFC) radio transceiver, a wireless local area network (WLAN) radio transceiver, or other components. It is understood that the mobile communication device 102 may considered a specialized machine that is configured to interact with a dynamic SIM 130.

The mobile communication device 102 further comprises a dynamic subscriber identity module (SIM) 130 that is a physical medium and may be removeably engaged with the mobile communication device 102, such as via a reader interface 128. However, it is understood that alternate embodiments of dynamic SIM 130 may include a physical medium that is embedded into the mobile communication device 102 at the time of manufacture such that it is not designed for removal by a user or technician. In an embodiment illustrated in FIG. 1B, the dynamic SIM 130 comprises a communication runtime framework 132 with modules and engines linked to application program interfaces that interact with a dynamic SIM operating system that collectively comprise a dynamic SIM runtime environment. The dynamic SIM 130 also comprises a processor 134 and memory 140. It is understood that execution of processor 134 may configure the dynamic SIM 130 according to information and instructions from any of applets 142 and/or a particular carrier applet 144, 146, 148 that is the active carrier applet. The memory 140 is a non-transitory memory and, although illustrated as a single memory 140, in some embodiments, memory 140 may comprise individual memory partitions each corresponding to particular applications on the dynamic SIM. The memory 140 may comprise firmware that stores the dynamic SIM 130 operating system and a plurality of applications (such as applets 142, steering applet 141, and carrier applets 144, 146, 148). It is understood that applets 142 may include information and instructions that interact between communication runtime framework 132 and device applications 112/application program interfaces of the mobile communication device 102. It is also understood that an applet may comprise a JAVA-based application that is stored in memory 140 and configured for execution by processor 134 on the dynamic SIM 130. In an embodiment, the communication runtime framework 132 may couple with the active carrier engine for determination of which carrier applet (e.g., 144, 146, 148) is active on the dynamic SIM 130.

The dynamic SIM 130 memory 140 includes an identifier from the manufacturer of the dynamic SIM card 130—such as a serial number that is exclusive to the dynamic SIM 130. Memory 140 may be segmented and comprise a plurality of memory partitions (such as dynamic subscriber identity (S.I.) partition A 143, dynamic subscriber identity (S.I.) partition B 145, partition C 147) of the dynamic SIM 130. Memory partitions (143, 145, 147) of the dynamic SIM 130 may be occasionally referred to herein as dynamic subscriber identity (S.I.) partitions. Each of the memory partitions (143, 145, through an $n^{th}$ partition N 147) comprises a unique carrier applet (e.g., carrier applet A 144, carrier applet B 146, through an $n^{th}$ carrier applet N 148 respectively) with each carrier applet being associated with a corresponding communication service provider/carrier and their network. For example, network A 160 and carrier A provisioning system 162 (sometimes referred to herein as "CAPS") may be associated with carrier A and thus correspond with the memory partition A 143 and carrier applet A 144, with carrier applet B 146 and memory partition B 145 corresponding accordingly with network B 170 and carrier B provisioning system 172 (sometimes referred to herein as "GBPS"). Provisioning system, e.g., 162, 172 may be comprise at least one remote server coupled to a network e.g., 160, 170.

Each of the carrier applets 144, 146, 148 may comprise provisioning attributes, a unique identifier, and/or specific communication network credentials corresponding and assigned to each individual carrier. The unique identifier of each of the respective carrier applets (such as 144, 146, 148) on the dynamic SIM 130 allows for a particular network (such as carrier A associated with network A 160) to identify valid subscriptions for communicative coupling of the mobile device with that particular network of a carrier. For example, a power cycle and/or trigger event may cause the mobile device 102 to read the active carrier applet's unique identifier (i.e., the particular carrier applet's unique identifier that is designated as the one active carrier applet). This may be done via the reader interface 128 using an Application Protocol Data Unit (ADPU) message to/from the steering applet 141 and/or the active carrier applet (e.g., one of 144, 146, 148). Each unique identifier corresponding to one of the plurality of carrier applets (144, 146, 148) may include any of a mobile subscriber equipment identifier (MSEI), international mobile state equipment identity (IMEI), cellular data number (CDN), and international mobile subscriber identity (IMSI), and mobile state international subscriber directory number (MSISDN). The unique identifier of the carrier applet (144, 146, 148) is communicated to the mobile device 102 based on the particular carrier applet being the active carrier applet on the dynamic SIM 130. In turn, the carrier application 118*a* of the mobile device 102 may change to using the wireless communication identity (through activation of the associated carrier sub-partition by use of steering applet 141) based on the corresponding active carrier applet. Similarly, the active carrier applet may be dynamically switched on the dynamic SIM 130 based on the mobile device's use of particular wireless carrier identity through activation in a corresponding carrier sub-partition 120, 122, 124. In some implementations, a carrier applet 144, 146, 148 may comprise firmware that, when the carrier applet is the active, configures the dynamic SIM 130 to report the unique identifier and/or use other information from the carrier applet upon request by the carrier application 118*a* of mobile device 102.

In an embodiment, the dynamic SIM 130 has one of the plurality of carrier applets (144, 146, 148) active, with the active carrier applet coexisting with the other carrier applets that each maintain storage of their own unique identifier corresponding to their carrier, network, and/or subscription. That is, the dynamic SIM 130 is advantageous because the active carrier applet may be loaded, provisioned, maintained, and function on the dynamic SIM 130 without overwriting other carrier applets and/or removing them from the dynamic SIM 130, thereby increasing the functionality and efficiency of operations on mobile device 102. Additionally, the dynamic SIM 130 may also switch which carrier applet is active among the plurality of carrier applets (144, 146, 148) and thus support subscription to multiple, different carriers, and also may cause dynamic changing of the mobile device 102 thus allowing a user to receive a corresponding experience (e.g., via the use of branding information and other customization parameters described herein) on the mobile device 102 based on the specific wireless communication identity and carrier sub-partition.

The dynamic SIM 130 comprises a steering applet 141 that supports switching among carrier applets 144, 146, 148 to make one of the carrier applets 144, 146, 148 the active carrier applet. In certain embodiments the steering applet 141 may be referred to as a bootstrap applet that is configured to interact with both a JAVA-based application on the dynamic SIM 130 and interact with a back-end switching mechanism such as steering system 180. The steering applet 141 may couple with the steering system 180 via wireless connection using the communication transceiver 104 for switching carrier applets. The steering system 180 may include any of a bootstrap server and/or subscriber management server, which may be communicatively coupled to partnering carriers and their corresponding networks 160, 170. It is understood that each network may cooperatively share the use of steering system 180 and/or alternatively have its own steering system 180. To switch between carrier applets 144, 146, 148 (and thus make one the active carrier applet), the dynamic SIM 130 may send and receive ADPU messages via the steering applet 141 and reader interface 128 to/from the steering system 180 over-the-air. An ADPU message may be initiated by any of a carrier application 118*a*, steering system 180, of carrier provisioning systems (e.g., 162, 172). The ADPU messages may include service objects that may be used for reporting information on the dynamic SIM 130, control switching which carrier applet is the active carrier applet, and/or for provisioning a particular carrier applet in a memory partition (e.g., 143, 145, 147) with information (e.g., unique identifiers, branding information, data pertaining to a corresponding wireless communication identity for the mobile device 102, etc.) which may be deemed provisioning data. The steering applet 141 may include information about the capability of the dynamic SIM 130 and what carrier applets (and thus carriers) may be supported by the dynamic SIM 130. For example, the steering applet 141 may identify, present, and/or provide which carrier applets are currently present and stored on the dynamic SIM 130 and/or whether the dynamic SIM 130 has the availability to accept a particular carrier applet. In other words, the dynamic SIM 130 may have multiple memory partitions (e.g., 143, 145, 147), but less than all of them may contain a carrier applet, thereby indicating that the dynamic SIM 130 has an available memory partition that may receive and load another carrier applet without affecting, overwriting, and/or reflashing memory of the carrier applets already existing on the dynamic SIM 130. The dynamic SIM 130 can identify which of the carrier applets 144, 146, 148 is the active carrier applet, and the steering system 180 may couple with the steering applet 141 to steer and/or switch to a different carrier applet on the dynamic SIM 130 thus making the different carrier applet the active carrier applet.

In some implementations, a carrier applet (and/or corresponding provisioning information for a carrier applet already stored on the dynamic SIM 130) may be delivered to the dynamic SIM 130 (e.g., using ADPU messages to write to an existing memory partition 143, 145, 147 of the dynamic SIM 130 or a newly created/available memory partition of the dynamic SIM) over-the-air via the communication transceiver 104. The dynamic SIM 130 may maintain previous storage and provisioning of one carrier applet on the dynamic SIM 130 while receiving, loading, and/or provisioning another carrier applet on the dynamic SIM (i.e., the carrier applet that is the active carrier applet). If a carrier applet is loaded on the dynamic SIM, but is unprovisioned or out of date, the steering system 180 may connect to a specific carrier provisioning server (such as carrier A provisioning system 162 when carrier applet A 144 is at issue) to receive the appropriate provisioning data that is written to the carrier-specific applet (such as carrier applet A 144) on the dynamic SIM 130 without affecting or altering other carrier applets maintained on the dynamic SIM. The provisioning data may then be delivered to the corresponding carrier applet on the dynamic SIM 130. Thus, the dynamic SIM 130 may be dynamically changed by adding, switching, and/or removing a specific carrier applet (and/or its firmware therein) that corresponds with the memory partition (such as 147) where the carrier applet resides.

The dynamic SIM 130 is advantageous because it can have a carrier applet added, switched, changed, and/or removed without replacing, overwriting, and/or affecting other carrier applets presently stored on the dynamic SIM 130. Although steering system 180 of FIG. 1A is illustrated as being coupled directly with BTS 150, it is understood that steering system 180 may connect with steering applet 141 through a variety of networks (such as 160 or 170) and in some embodiments may communicate with a specific carrier's provisioning system (such as 162 and/or 172). Each delivery mechanism (e.g., 162, 172, 180) used for provisioning may be staged as independent and/or dependent servers being dependent on carrier A provisioning system 162. It is also understood that in some embodiments a dynamic SIM 130 may comprise at least one carrier applet prior to identification and/or interaction with a communication service provider's network or may receive carrier applets (and/or provisioning data for the carrier applet) specific to a particular carrier based on identification of that carrier's network. In an alternate embodiment, memory partitions 143, 145, 147 of the dynamic SIM 130 may be a trusted secure partition (i.e. a trusted security zone), which may be associated with a corresponding trusted secure partition (e.g., if carrier sub-partitions 120, 122, 124 are trusted security zones) of the mobile communication device 102.

In an implementation, memory 110 comprises device applications 112, a system partition 114, a user partition 116 and a carrier partition 118 that includes carrier sub-partitions A through N, 120-124 respectively. Each carrier sub-partition 120, 122, 124 may comprise a respective wireless communication identity with its own corresponding network access identifier and own customization. Each respective customization of a carrier sub-partition's wireless communication identity may comprise any of branding information (e.g., branding ID and/or link to branding information), device capability, application configuration, and user experience preferences. It is understood that there may be many more carrier sub-partitions than illustrated in FIG. 1A, with each comprising a unique carrier identity. The limit of the maximum number of partitions (such as carrier sub-partitions 120, 122, 124) in which to store the carrier identities may be determined by the total portion of memory 110 and/or carrier partition 118 allocated for the carrier identities. The portion of memory 110 allocated for the carrier identities may comprise internal memory and file memory, and in some embodiments may be a trusted security partition as discussed. Partitions that are associated with different carrier identities may be of different sizes. For example, a first carrier sub-partition A 120 may be larger in size than the second carrier sub-partition B 122. It is also understood that there may be more than two carrier sub-partitions or carrier identities depending on factors such as the size of the memory and/or hardware of the mobile communication device 102.

The carrier partition 118 comprising carrier sub-partition A 120 may include the first wireless communication identity that comprises the customization for a certain carrier and may be loaded at the time of fulfillment of the mobile communication device 102. The first wireless communication identity may bound be to a single brand associated with the carrier (such as the carrier associated with network A 160), and the corresponding customization of the mobile device 102 defines the device capabilities associated with that single brand—such as whether the mobile device 102, upon activation on the device 102 to that brand, has the ability to roam on another network, what contacts it can store, whether the device 102 can serve as a hotspot for other wireless fidelity (WiFi) networks, etc. A second wireless communication identity of carrier sub-partition B 122 may be bound to a brand that is not the same as the brand to which the first identity is bound, but have another customization of whose device capabilities, application configuration, and user experience may comprise a subset or similar configurations as the first customization associated with the first identity. During the activation of the device 102 (and/or a particular sub-partition 120, 122, 124 of the device 102), both identities associated with the corresponding sub-partition 120, 122, 124 may be able to communicate with the networks 160 and 170 responsive to the mobile communication device 102 being provisioned in the networks 160 and 170. For example, device 102 may communicate via BTS 150 over network 160 when the first wireless communication identity and the carrier sub-partition A 120 are active, and may communicate via BTS 150 over network 170 when the second wireless communication identity and carrier sub-partition B 122 are active.

Branding is a general marketing term that applies to many products and may be considered to be the process of distinguishing a product or products of a given brand from those of other brands. Thus, branding for a particular carrier (associated with a wireless communication identity) may be accomplished using names, terms, graphic images, design methods, aural cues, or any other feature that distinguishes. In the context of electronic devices, for example mobile communication devices, a wireless communication identity may comprise branding information, which in turn may comprise a distinctive splash screen that displays when an application is loading, a background theme that displays behind application icons, a distinctive wall paper, a distinctive aural alert that may be sounded when events associated with fundamental functions of the device occur, and/or other distinctive cues. Branding information may comprise firmware that customizes controls and/or switches of a mobile communication device. Branding information may comprise a short code that references a voice mail service. Branding information may comprise preferred universal reference locators (URLs) that may be provided as pre-loaded favorites in a web browser. Branding information may comprise a link to a preferred on-line application store. Branding information may also include other media and settings. A particular wireless communication identity may request, retrieve, and/or receive brand information, and when the wireless communication identity is activated (meaning it is the active wireless communication identity on the mobile device), the mobile device may dynamically change to the particular firmware, customization, and/or parameters associated with the branding information and/or user preferences.

A wireless communication identity (occasionally referred to herein as carrier identities for aspects relating to a specific carrier) may be activated on a sub-partition by dynamically changing to that corresponding carrier sub-partition via a carrier application 118a. Some embodiments may include dynamically changing and/or activation based on a trigger event, such as but not limited to, changes/switching on a dynamic subscriber identity module 130, user input via the user interface 106 that selects different brands tied to corresponding wireless communication identities, steering by a server and/or system of a network, predefined scheduling, over the air control by a server, and/or a geographic location of the mobile communication device 102. For example, responsive to receiving user input that switches branding and parameters to a second wireless communication identity of carrier sub-partition 122 from the first wireless communication identity of carrier sub-partition 120, the carrier application 118a applies the corresponding customization comprising any of brand identifier, device capabilities (hardware, software, firmware), application configurations and user experience to the mobile communication device 102. The carrier application 118a may further reference a source (e.g., a memory partition of the mobile device 102, and/or a remote server 162, 172) to apply at least some user preferences and/or branding information that customizes and dynamically applies changes to the device 102. The mobile communication device 102 may also transmit, via the communication transceiver 104, the appropriate identity to use the corresponding network that the second wireless communication identity and sub-partition are associated with for conducting wireless communications coupling.

The mobile communication device 102 comprising the carrier partition 118 may undergo a system reset, where the carrier sub-partitions 120, 122, 124 and the related wireless communication identities remain intact (within the non-transitory memory 110) with the corresponding customizations in place. The carrier sub-partitions 120, 122, 124 are preserved with the wireless communication identities and their customizations that activate the mobile communication device 102 to communicate with a radio access network (and/or network A 160 and/or network B 170) through the communication transceiver 104. In some embodiments, responsive to dynamically changing between the carrier partitions (sub-partitions 120, 122, 124), customization information of a corresponding wireless communication identity may be updated by an associated communication service provider (e.g., carrier provisioning systems 162, 172). However, there may be no need for re-provisioning of a wireless communication identity in the network if it is already provisioned as part of the initial load to the mobile device 102 by the manufacturer. The same is true of the switch back to a previously activated carrier sub-partition 120, 122, 124 and corresponding identity. The term dynamic changing refers to which software, hardware, and/or firmware are used by a mobile device 102 and/or dynamic SIM 130 based on the corresponding wireless communication identity (e.g. those stored in carrier sub-partitions 120, 122, 124) and/or carrier applet (e.g., 144, 146, 148). This means that the mobile device 102 and/or dynamic SIM 130 may be dynamically changed through the specific information (e.g., customization parameters, user data, branding information, provisioning from a carrier, etc. as discussed herein) comprised in a wireless communication identity and/or carrier applet.

As discussed above, embodiments of the present disclosure may implement a trusted security zone. A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety.

Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

In an embodiment, the memory 110, memory 140, and/or a partition (e.g., carrier partition 118 and/or memory partition A 143) that is a trusted security zone is more than just a segment of memory. The trusted security zone may also have a dimension of processing. The trusted security zone may provide the secure execution environment for trusted applications where only trusted applications may operate, safe from attacks. The trusted security zone may be implemented by partitioning both hardware and software resources of the mobile communication device 102 into two segments: a secure portion/segment and a normal portion/segment. The secure segment may be implemented by a distinct, separate, or dedicated physical processor, usually the first processor, from the processor by which the normal segment may be implemented, usually the second processor. Alternatively, the secure segment may be implemented by a distinct, separate, or dedicated virtual processor from the virtual processor by which the normal segment may be implemented. In an embodiment, the hardware segmentation of the trusted security zone and the software installation of the trusted security zone may enable a trusted execution environment on the mobile communication device 102. The trusted execution environment may be included/integrated within an application processor on the mobile communication device 102 at the chip manufacturer.

In an alternate embodiment using a trusted security zone, the system partition 114, the user partition 116, the carrier sub-partitions 120, 122, 124 may be implemented by partitioning both hardware and software resources of the electronic device 102 into two segments: a secure portion/segment and a normal portion/segment. That is, in this alternate embodiment, carrier sub-partitions 120, 122, 124 may comprise a secure portion (trusted security zone) while the system partition 114 and/or user partition 116 may comprise a normal portion/segment. The secure segment may be implemented by a distinct, separate, or dedicated physical processor, usually a first processor, from the processor by which the normal segment may be implemented, usually a second processor. Alternatively, the secure segment may be implemented by a distinct, separate, or dedicated virtual processor from the virtual processor by which the normal segment may be implemented.

In some implementations, the trusted security zone may be apportioned into different partitions—such as carrier sub-partition A 120, carrier sub-partition B 122, etc.—that, in some embodiments, store wireless communication identities. In some implementations, each trusted security zone partition on the mobile device 102 may be allocated and associated according to a corresponding carrier applet on the dynamic SIM 130. The partitions may not necessarily be created inside the trusted security zone. In an embodiment, at least some partitions that store wireless communication identities may be created within a secure part of the mobile communication device 102 and each partition may vary in memory size. In alternate embodiments, a dynamic SIM 130 may be apportioned into partitions (e.g., similar to 143, 145, 147 of FIG. 1B) with each partition being a trusted security zone.

In an embodiment, the carrier memory partition 118 may be provided by the operating system of the mobile communication device 102. For example, the operating system may restrict access to a system memory partition (such as 114) exclusively responsive to providing a system memory partition password, for example a system password known to an original equipment manufacturer of the mobile communication device 102; the operating system may restrict access to the carrier memory partition (such as 118 or sub-partition therein) exclusively responsive to providing a carrier memory partition password, for example a carrier password known to a telecommunications service carrier; and the operating system may allow access to a user memory partition (such as 116) substantially without restriction.

Access to a trusted security zone may be contingent on providing a master trusted security zone key, for example access to configure or add trusted security zone partitions. Access to configured trusted security zone partitions may be authorized by presenting an access key, for example a sub-zone key or a trusted security zone partition key associated with the subject trusted security zone partition. Stated differently, a first sub-zone key may be used to authorize access to the first trusted security zone partition, a second sub-zone key may be used to authorize access to the second trusted security zone partition, and a third sub-zone key may be used to authorize access to the third trusted security zone partition, with each of the respective sub-zone keys being different from each other. For more details on trusted security zone segments and sub-zone keys, see U.S. patent application Ser. No. 13/571,348, filed Aug. 10, 2012, entitled "Systems and Methods for Provisioning and Using Multiple Trusted Security Zones on an Electronic Device," by Stephen J. Bye, et al., which is hereby incorporated by reference in its entirety. While the description herein describes implementations based on using a trusted security zone, it is understood that the teachings of the present disclosure may also be used in partitions or in portions of memory outside of a trusted security zone. For example, an alternative embodiment of carrier partition 118 would store carrier application 118a in a non-trusted security zone, while carrier sub-partitions 120, 122, and 126 would be trusted security zones.

Figure 2A:
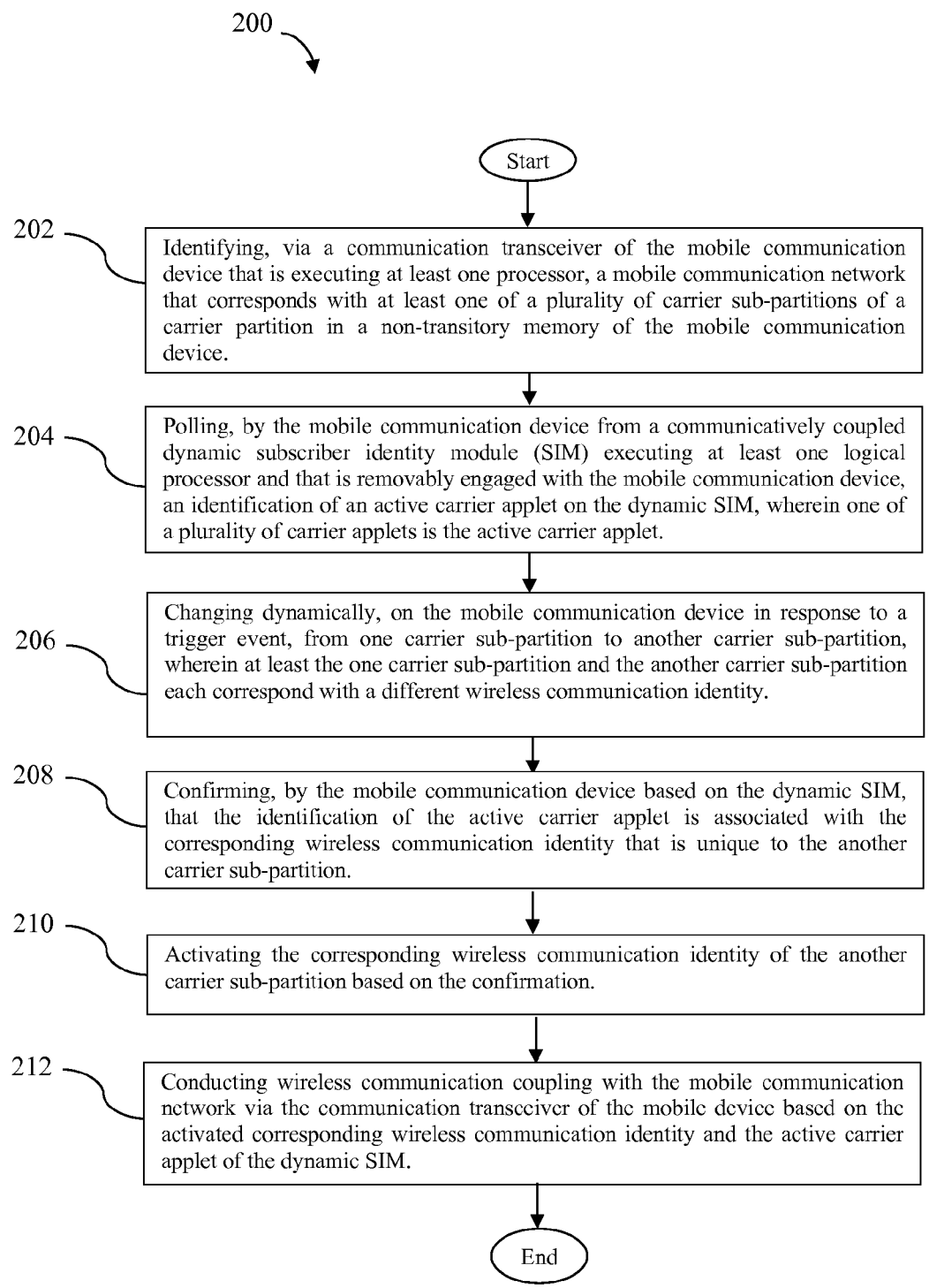
FIG. 2A is a flow chart illustrating a method according to an embodiment of the disclosure.
Figure 2B:
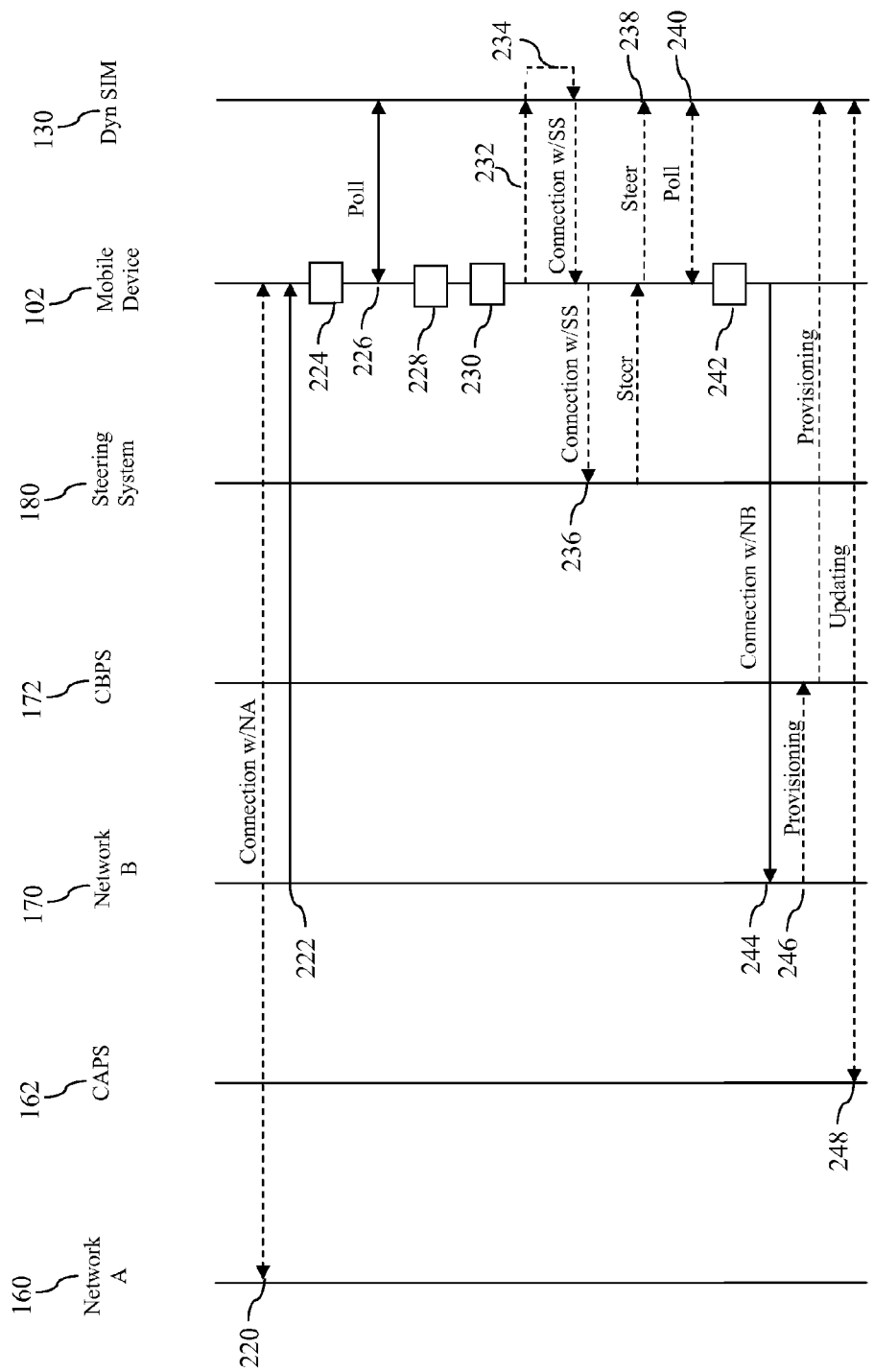
FIG. 2B is a messaging diagram according to an embodiment of the disclosure.

Turning now to FIG. 2A and FIG. 2B, a flow chart in FIG. 2A illustrates a method 200 of dynamically changing a mobile communication device (e.g., 102) using a communicatively coupled dynamic SIM (e.g., 130). Additionally, FIG. 2B illustrates a messaging diagram that corresponds with an embodiment of the present disclosure. It is understood that embodiments of the present disclosure may be implemented by system 100 disclosed in FIG. 1A. At block 202, a mobile communication network (such as network B 170) is identified on the mobile communication device that comprises a carrier partition which corresponds and/or is associated with the identified mobile network. The mobile communication network may be one of a plurality of mobile networks. Additionally, the mobile communication device is communicatively coupled with a dynamic SIM (such as 130) that may be pre-provisioned with a carrier applet that corresponds and/or is associated with the identified mobile network. It is understood that in some embodiments, the mobile communication device may be any of communicatively coupled, have a connection with, and be primarily designated to another mobile network prior to identification of the mobile network by the mobile device. For example, mobile device 102 may have an established connection 220 that receives a wireless transmission from network A 160 prior to receiving a separate wireless transmission 222 from network B 170 on mobile device 102. The separate wireless transmission 222 may be identified 224 by the mobile device 102, such as through an application (e.g., 118a) that analyzes, correlates, and/or determines the source of transmission and/or the associated carrier by, for example, referring to a list of known networks and associated wireless technologies for attaching/coupling the mobile device 102 to a particular network. Receiving and identifying a wireless transmission (e.g., 222) may be referred to as a received signal transmission incident, which may be a type of trigger event discussed herein. Once a transmission (e.g., 222) is identified 224 as being associated with a carrier and network (in this case network B 170), the mobile device 102 can determine whether network B 170 has been previously identified and whether an associated wireless communication identity has been previously activated on the mobile device 102 and/or a carrier applet is loaded on or previously active on the dynamic SIM 130.

As an aside, it is understood that a mobile communication device (e.g., 102) may dynamically identify a particular carrier and/or wireless communication network by correlating received wireless transmissions with one or more lists of wireless communication networks that allow for authorization to connect and establish an initial wireless link to the base transceiver. The mobile device 102 may also refer to a rule set for prioritizing among the networks identified in the one or more lists, and one or more tables of device rules. In an embodiment, the lists and the tables may be compiled and/or reformatted to efficiently combine content as a list or table at run-time on the mobile communication device 102, for example in the event of a communication transceiver 104 reset, power cycle, or received instruction. The lists of wireless communication networks that the mobile communication device 102 is authorized to attach to may depend on the wireless communication protocol used by the mobile communication device 102 to establish a wireless link to the BTS 150. Said in another way, the particular lists—the number of lists and the names of lists—of wireless communication networks may be different for mobile communication devices 102 communicating according to different wireless communication protocols. The lists of wireless communication networks may comprise any of: a preferred roaming list (PRL), a public land mobile network (PLMN) list, an operator controlled PLMN (OPLMN) list, a home PLMN (HPLMN) file, an equivalent home PLMN (EHPLMN) list, a MMSS (multi-mode system selection) System Priority List (MSPL), MSPL table, and a MMSS Location Associated Priority List (MLPL) table.

The PRL may comprise information (e.g., network parameters, addresses, etc.) used in network and/or system selection and acquisition. The PRL may organize the information in prioritized order, for example defining what systems and/or service provider identities to scan and in what order to obtain radio communication access. The PLMN list may comprise a list of public land mobile networks and/or other lists, such as an EHPLMN list or an OPLMN list. The HPLMN list may comprise a list of networks or communication systems identified by mobile country code (MCC). The EHPLMN list may comprise records of networks or communication systems identified by Mobile Country Code (MCC). The OPLMN list may comprise records of networks or communication systems identified by Mobile Network Code (MNC). The MSPL table may be used with another system selection priority list (e.g., PLMN list, OPLMN list, HPLMN list, EHPLMN list, and the like). The MLPL table may enable scaling a range of entries of a system selection priority list (e.g., PLMN list, OPLMN list, HPLMN list, EHPLMN list, and the like).

These lists and/or tables may be said to implement, define, and/or describe a coverage map. In an embodiment, the MSPL and the MLPL lists or tables may provide geocoding and preference information and may promote mapping between 3GPP and 3GPP2 protocols. The tables of device rules may comprise a band support table and a technology order table. The band support table may identify ranges of radio frequency that the mobile communication device 102 should scan for attaching to a radio access network (RAN), for example to attach to the BTS 150 and/or any of networks 160, 170. In some implementations, multiple lists and tables may be compiled and/or reformatted to efficiently combine the content as a list or table at run-time on the mobile communication device 102, for example based on a trigger event and/or communication transceiver reset.

Turning back to FIGS. 2A and 2B, at block 204, the mobile communication device 102 may poll, read, and/or request the dynamic SIM 130 for an identification (i.e., the unique identifier such as an IMSI that is active at the time of polling) of the carrier applet on the dynamic SIM 130 that is the active carrier applet. The dynamic SIM 130 may include a plurality of carrier applets stored in memory and one carrier applet is activated, thereby being the active carrier applet at any one time. This process of obtaining values and/or identification of information of the dynamic SIM 130 may be referred to as polling the dynamic SIM 130 and may be accomplished by using the ADPU messages or by another method. Polling may be initiated by the mobile device 102, by a remote server (e.g., 162, 172, 180) over-the-air, or by another method. In some implementations, polling may occur iteratively according to a predefined schedule, and/or based on a trigger event. For example, the dynamic SIM 130 may respond to the polling (by sending a message 226 that indicates which carrier applet (if any) is the active carrier applet (e.g., an ADPU message comprising at least the unique identifier of the active carrier applet). In some embodiments, the mobile device that undergoes a power cycle, reset, and/or restart may read the dynamic SIM 130 for the currently active carrier applet (and thus its unique identifier) and analyze whether it is associated with the wireless communication identity previously active and/or the previous mobile network with which the mobile communication device 102 was previously connected.

At block 206, the mobile communication device 102 dynamically changes, in response to a trigger event, from one carrier sub-partition to a different carrier sub-partition, This dynamic change may deactivate particular software, firmware, and/or hardware according to the previous wireless communication identity, and activate the different wireless communication identity associated with the different carrier sub-partition. As illustrated in FIG. 2A, a carrier sub-partition (which may be a trusted secure partition in the carrier partition) has (or may be provisioned/updated to have) a unique wireless communication identity that corresponds with a carrier, mobile network, and/or carrier applet of the dynamic SIM 130. The wireless communication identity may be activated responsive to the dynamically changing from one sub-partition to another and/or based on analysis that the mobile device is using the appropriate wireless communication identity of the carrier sub-partition.

A trigger event may comprise events that are based on: the dynamic SIM 130, user input, pre-defined scheduling on the mobile device, determined location of the mobile communication device, and/or server based. A trigger event 228 may occur and be identified and recognized by any of the mobile device 102, the dynamic SIM 130, and/or a remote server (e.g., 162, 172, 180). The trigger event may be based on received input on the mobile device 102 that directs the mobile device 102 to connect to network B 170. For example, the mobile device 102 may recognize it is in a particular geographic location (which may be pre-defined on and/or pushed to the mobile device 102), and thus triggers subsequent dynamic changes of the mobile device 102 (e.g., changing sub-partitions and activating wireless communication identities as discussed herein) and/or the dynamic SIM 130 (e.g., switching, loading, provision, activating carrier applets as discussed herein). Continuing with FIG. 2B, based on the trigger event 228, dynamic changing 230 from one carrier sub-partition to a different sub-partition may occur that directs the mobile device 102 to use the parameters and information for hardware, software, and/or firmware according to the different carrier sub-partition and associated wireless communication identity. This may be advantageous by improving the mobile device's ability to function and use the corresponding network (such as 170) by customizing and/or tailoring the hardware, software, and/or firmware that is used on the mobile device in communicative coupling with the particular network.

Note that the sequential ordering of steps (e.g., trigger event 228) are merely exemplary, and it is understood that certain steps (e.g., occurrence of trigger event 228) may occur in alternate sequence, such as prior to receiving transmission 222 from network B 170. For example a trigger event 228 may be the mobile device 102 dynamically changing 230 between carrier sub-partitions, and once identified as a trigger event 228, switching of the active carrier applet to another carrier applet may occur on the dynamic SIM 130. As illustrated by dashed lines in FIG. 2B, the mobile device may initiate 232 the dynamic SIM 130 to change the active carrier applet. The dynamic SIM 130 and/or mobile device 102 may then initiate 234 a steering applet 141 that connects with steering system 180 (which may comprise a server for switching the active carrier applet). The steering applet may request 236 connection via the mobile device 102 to the steering system 180 for switching to a carrier applet on the dynamic SIM 130 (e.g., through an ADPU message) that corresponds with the identified network B 170 and/or associated carrier sub-partition (that was dynamically switched to) on the mobile device 102. The steering system 180 may determine the capabilities of the dynamic SIM 130 and/or analyze whether the dynamic SIM 130 includes (i.e., is loaded with and/or has stored) a particular carrier applet. Although not illustrated in FIG. 2B, the steering system 180 may interact with a carrier provisioning server (e.g., 162, 172) during a process of steering carrier applets and/or loading/provisioning an associated carrier applet on the dynamic SIM 130. The steering system 180 then instructs and steers 238 the dynamic SIM 130 via the mobile device 102 to make one carrier applet the active carrier applet on the dynamic SIM 130. Subsequent to switching the active carrier applet already stored (and/or steering the dynamic SIM 130 to a new carrier applet dynamically loaded onto the dynamic SIM 130), polling 240 may occur between the dynamic SIM 130 and the mobile device 102 which receives the identification of the active carrier applet on the dynamic SIM 130.

At block 208 of FIG. 2A, the mobile device 102 may confirm that the identification of the active carrier applet from the dynamic SIM 130 is associated with the corresponding carrier partition (and thus wireless communication identity that is unique to that carrier partition) of the mobile device. This may include analyzing the unique identifier associated with the active carrier applet for association with the wireless communication identity of the corresponding carrier partition of the dynamic SIM. At block 210, the wireless communication identity of the carrier sub-partition (that may be a secure partition) is activated based on the confirmation. In some embodiments, after confirming that the carrier applet that is active on the dynamic SIM 130 appropriately corresponds with the wireless communication identity and partition on the mobile device 102, the mobile device 102 may ensure that the mobile device 102 has been dynamically changed to reflect the wireless communication identity that is active (e.g., the particular customization parameters, branding information, and identity information) and/or other preferences of the carrier/user input. For example, in FIG. 2B, the mobile device 102 may analyze 242 and confirm that the active carrier applet 146 matches the carrier sub-partition 122 that was switched to and comprises the associated wireless carrier identity that is active. The mobile device 102 may then request 244 connection and use of network B 170.

At block 212, the mobile communication device 102 conducts wireless communication coupling with the identified network via a communication transceiver 104. Thus, the mobile communication device 102 is actively and dynamically able to subscribe to multiple carriers in various geographic locations, while also receiving appropriate unique customization, parameterization, branding, and identity when the device is activated to that carrier through the use of an active wireless communication identity and active carrier applet. This may also allow a user to avoid roaming charges and provide an experience on the mobile device that is unique to the carrier with which the mobile device 102 is actively subscribed. As shown in dashed lines in FIG. 2B, carrier B provisioning system 172 may send 246 provisioning information to the mobile device and/or dynamic SIM 130 to apply provisioning parameters for communicatively coupling the mobile device to network B 170. While mobile device 102 and the dynamic SIM 130 have associated carrier sub-partition and carrier applet, the dynamic SIM 130 may be able to receive 248 an update (e.g., for provisioning information, unique identifier, etc.) from carrier A provisioning system 162 related to the carrier applet on the dynamic SIM 130 associated with carrier A (network A 160) without erasing and/or overwriting other carrier applets of the dynamic SIM 130 or wireless communication identities on carrier sub-partitions of the mobile device 102. Thus, the carrier applet on the dynamic SIM 130 and wireless communication identity on the carrier sub-partition may be activated, provisioned, and updated without requiring subsequent user input.

Figure 3A:
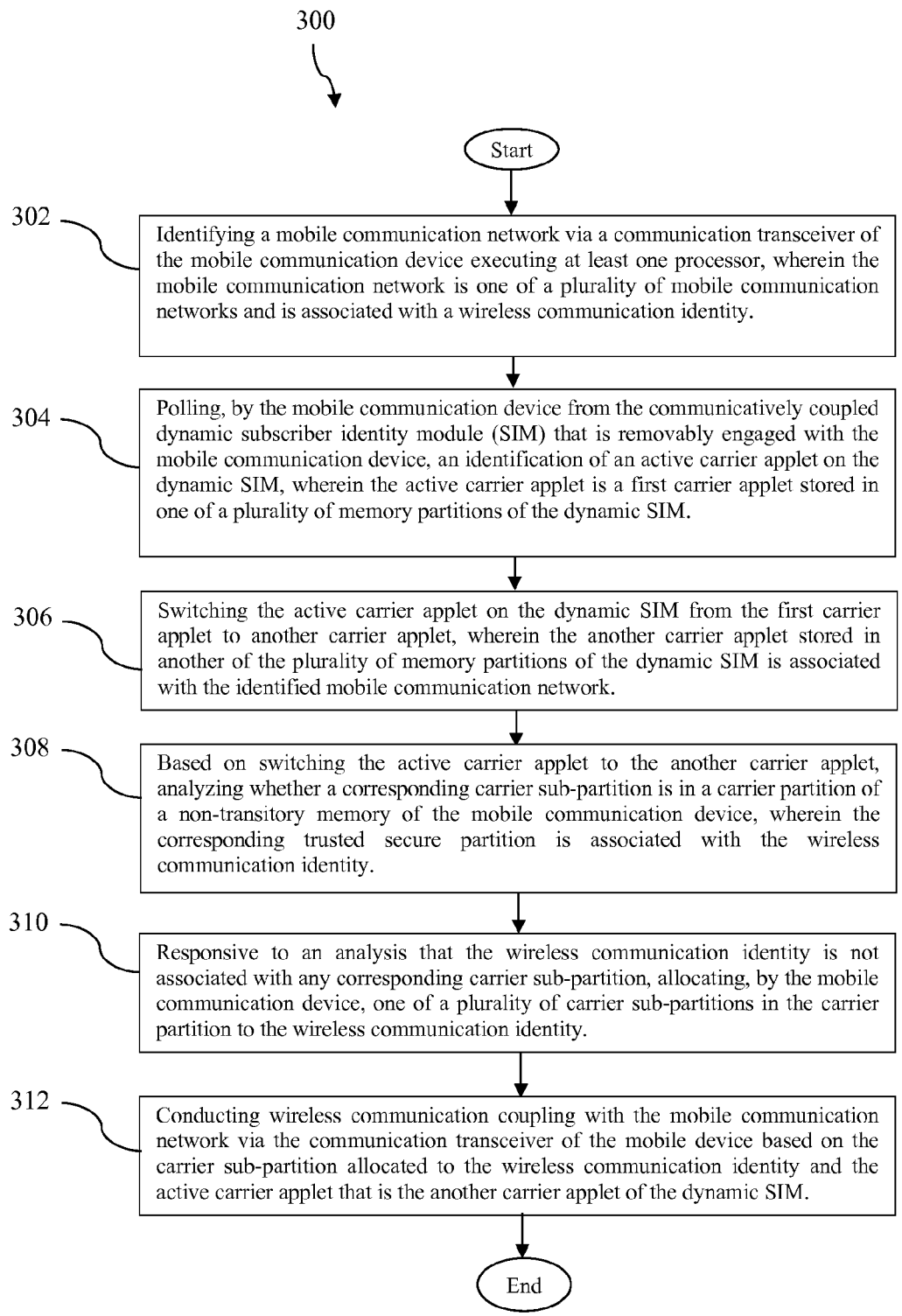
FIG. 3A is a flow chart illustrating a method according to an embodiment of the disclosure.
Figure 3B:
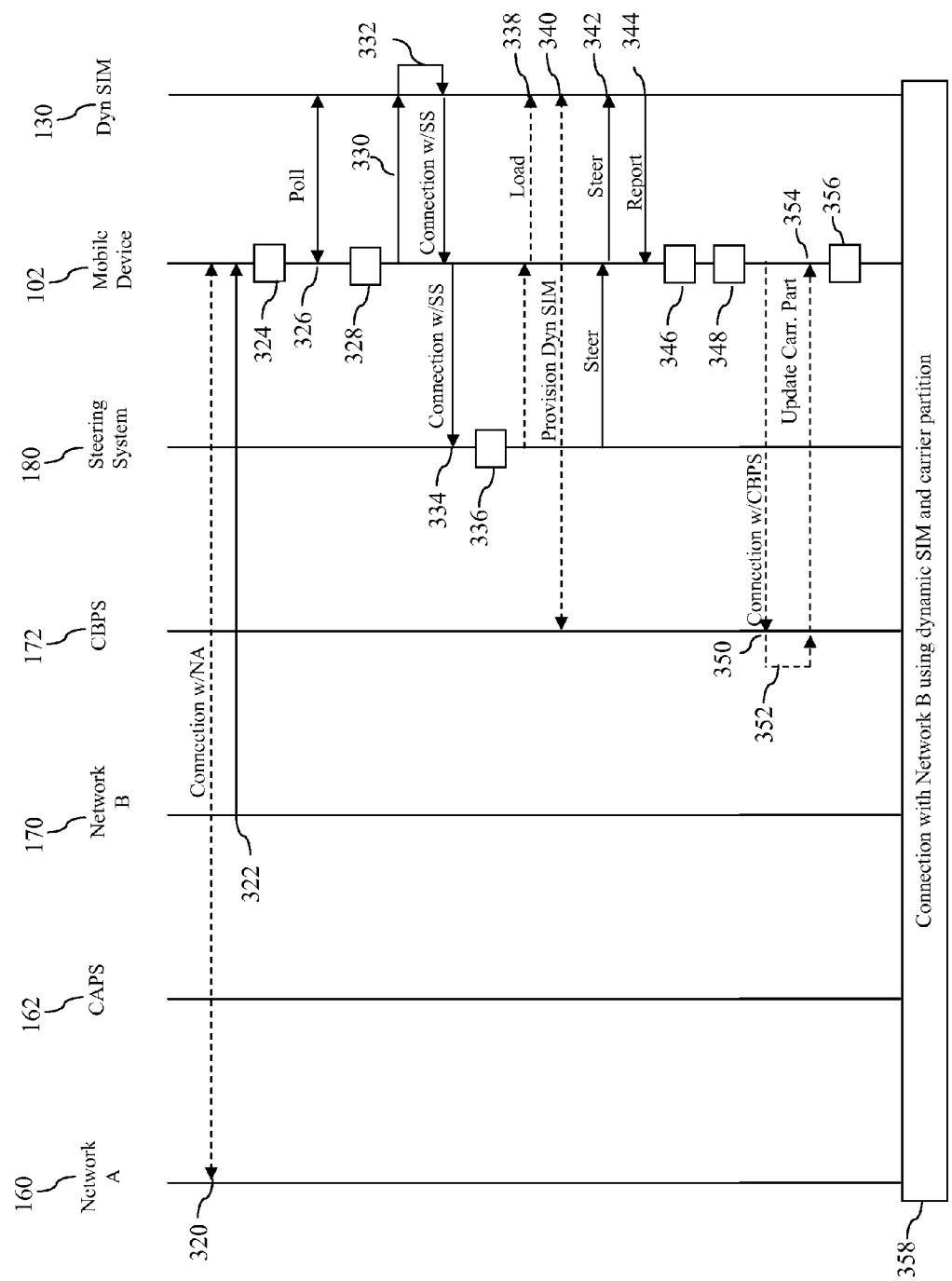
FIG. 3B is a messaging diagram according to an embodiment of the disclosure.

Turning now to FIG. 3A and FIG. 3B, a flow chart in FIG. 3A illustrates a method 300 of dynamically changing a mobile communication device 102 using a communicatively coupled dynamic SIM 130 according to an embodiment. Additionally, FIG. 3B illustrates a messaging diagram that corresponds with an embodiment of the present disclosure. At block 302 the mobile communication device identifies a mobile communication network that is one of a plurality of mobile communication networks recognizable by the mobile communication device 102. Identification of a mobile communication network may occur as discussed above in FIGS. 2A and 2B. The mobile communication network is also associated with a wireless communication identity that may be specific to a carrier associated with the identified communication network. For example, in FIG. 3B, some embodiments may include mobile device 102 connected with network A 160 and receiving transmissions 320 from network A 160. The mobile device 102 may receive a transmission 322 and identify 324 the transmission as being associated with mobile communication network B 170.

At block 304, the mobile communication device 102 may poll, read, and/or request the identification of the active carrier applet from the communicatively coupled dynamic SIM 130, which may be removeably engaged with mobile device. The active carrier applet is one of a plurality of carrier applets that are capable of being stored on the dynamic SIM 130. For example, the active carrier applet is a first carrier applet that is stored in one of the plurality of memory partitions (such as the memory partitions 144, 146, 148). As illustrated in FIG. 3B, the mobile device 102 may poll and identify 326 the active carrier applet and thus the identity of its corresponding network and carrier. The mobile device 102 (via carrier application 118a) may determine 328 that the currently active carrier applet of the dynamic SIM 130 is not associated with the identified 322 network B 170. To make the dynamic SIM 130 correspond with the identified mobile network B 170, the currently active carrier applet is switched (or in some instances loaded from a remote system such as 162, 172, 180 onto the dynamic SIM 130) to another carrier applet—that is, the carrier applet which is associated with the identified mobile network B 170.

At block 306 of FIG. 3A, the active carrier applet on the dynamic SIM 130 is switched from the first carrier applet to another carrier applet. The other carrier applet is also stored in one of the plurality of memory partitions of the dynamic SIM 130, with that particular memory partition being associated with the identified mobile communication network. For example, as illustrated in FIG. 3B, the mobile device 102 may instruct 330 the dynamic SIM 130 to switch the active carrier applet. The dynamic SIM 130 may have the steering applet activated 332 and in use when connected with the steering system 180. The dynamic SIM 130 may connect 334, via the mobile device 102, with the steering system 180 to switch from one carrier applet to another. In an embodiment, the steering system 180 may be used during determination 336 of the capabilities of the dynamic SIM 130 and/or which carrier applets are currently loaded into partitions of the dynamic SIM. When the dynamic SIM 130 has the appropriate carrier applet loaded in a memory partition (e.g., dynamic subscriber identity partition 143, 145, 147), the steering system 180 may steer 342 the dynamic SIM 130 to another carrier applet of the corresponding partition such that the another carrier applet is the active applet. Thus the identified network B 170 would correctly correspond with active carrier applet that is another carrier applet.

As illustrated in dashed lines in FIG. 3B, the dynamic SIM 130 may (when needed) be loaded 338 with the corresponding carrier applet into an available memory partition of the dynamic SIM 130. That is, the dynamic SIM 130 may have an empty memory partition available for designation, loading, and/or installation with a carrier applet. Once the dynamic SIM 130 is loaded with the carrier applet that is associated with the identified network (e.g., network B 170), it may be switched to and thus become the active carrier applet. It is understood that loading, writing to, provisioning, and/or updating a carrier applet of the dynamic SIM 130 may retain (i.e., not overwrite or erase in a memory partition) storage of other carrier applets (and/or provisioning therein) that maybe present on the dynamic SIM 130. That is, a plurality of carrier applets (that each comprise unique identifiers) may be maintained in parallel storage on the dynamic SIM 130. A carrier applet may be stored without provisioning in a memory partition (e.g., 143, 145, 147) of the dynamic SIM 130—that is, the unprovisioned carrier applet may be identified as being stored on the dynamic SIM 130 despite lacking at least some provisioning parameters associated with a particular carrier. The unprovisioned carrier applet of the dynamic SIM 130 may be initially considered a base applet (generic applet) that may be dynamically provisioned without overwriting the carrier applet and/or other carrier applets (or their provisioning therein). In some embodiments, unprovisioned carrier applets (i.e., base or generic applets) may be loaded into memory of the dynamic SIM 130 at the time of manufacture and/or prior to engagement with the mobile device 102. Additionally, the loaded carrier applet may also be provisioned 340 via a carrier B provisioning system 172 which may write to the carrier applet that provisions carrier-specific credentials to connect to the carrier network, which in the illustrated embodiment of FIG. 3B would be network B 170. After the active carrier applet is switched, the mobile device 102 may receive a report 344 of the identification of the active carrier applet to ensure that the intended carrier applet is now the active applet on the dynamic SIM 130.

At block 308, the carrier application on the mobile device may analyze whether a trusted secure partition (such as carrier sub-partitions 120, 122, 124), that corresponds with the active carrier applet on the dynamic SIM 130, is allocated in a carrier partition of the mobile communication device 102. The analysis is based on switching the active carrier applet, and each of the plurality of carrier sub-partitions being associated with a respective wireless communication identity that may be provisioned (e.g., loaded or updated with particular information and parameters like branding information as previously discussed) for a particular carrier. For example, in FIG. 3B the mobile device 102 uses the identification of the switched carrier applet (that is now the active carrier applet) and determines 346 which wireless identity on the mobile device 102 is being used (i.e., which of the carrier sub-partitions is currently active) and whether it corresponds and is associated with both the identified network B 170 and active carrier applet on the dynamic SIM 130. In an embodiment, the analysis may yield a result that confirms that a carrier partition on the mobile device 102 is present and has been allocated with an associated wireless communication identity, and thus may allow the mobile device 102 to dynamically change to (and/or activate) that partition (e.g., carrier sub-partitions 120, 122, or 124) on the mobile device 102. It is understood that, in some implementations, dynamic changing on the mobile device 102 may be triggered by switching carrier applets on the dynamic SIM 130, while other implementations may have activation and/or dynamic changing of carrier sub-partitions on the mobile device 102 trigger switching of the active carrier applet. Dynamically changing the mobile device 102 by activating one of the partitions (e.g., carrier sub-partitions 120, 122, or 124), which thus activates the associated wireless communication identity, may improve the operation of the mobile device 102 connecting with a corresponding carrier by customizing the mobile device 102 according to the activation of information from the wireless communication identity of the partition on the mobile device 102 which may change and implement the active parameters of hardware, firmware, and/or software used on the mobile device 102. This may reduce overhead cost (reduced active memory, reduced storage space, reduced battery usage) for applications, radios, and other parameters that are not required for use with the corresponding carrier's network, but may be required for alternate carrier that are associated with wireless communication identities of other carrier sub-partitions.

At block 310, an analysis on the mobile device 102 may indicate that the wireless communication identity currently active on the carrier sub-partition is not associated with the identified network and carrier applet because it corresponds with a different carrier. In some embodiments, a wireless communication identity may not yet be active on the mobile device 102. Additionally, the analysis may indicate that the wireless communication identity corresponding with the identified mobile communication network and carrier applet is not associated with any of the partitions (e.g., carrier sub-partitions 120, 122, or 124) on the mobile device 102. Thus, the carrier application (e.g., 118a) may allocate one of the plurality partitions in the carrier partition (e.g., an unused carrier sub-partition) to the wireless communication identity that corresponds with the active carrier applet, network, and carrier. For example, in FIG. 3B, the mobile device 102 may allocate 348 one of the carrier sub-partitions of the memory 110 to wireless communication identity that is associated with the network B 170 and active carrier applet on the dynamic SIM 130 that was switched. This may be responsive to determining that the carrier sub-partitions on the mobile device 102 did not correspond with the correct wireless communication identity for network B 170 (and carrier applet) and thus one of the carrier sub-partitions may be allocated and/or created. In some embodiments, allocation and/or creation of a carrier sub-partition (which may be a trusted secure partition) may include provisioning and parameterization according to the specifications of any of a user, carrier, and operator.

As illustrated in FIG. 3B shown in dashed lines, it may be the first time that the mobile device 102 has interacted with network B 170. To ensure that the carrier partition of the mobile device 102 has a proper wireless communication identity and carrier sub-partition for association with an identified network (e.g., network B 170) and the corresponding carrier applet on the dynamic SIM 130, mobile device 102 connects 350 with carrier B provisioning system 172 to obtain, receive, and/or be provided with the corresponding wireless communication identity and/or associated information. The carrier B provisioning system 172 may determine 352 the carrier-specific program release information (PRI) applied to the mobile device 102 in order to stage the particular carrier sub-partition platform for over the air customization accepted on the mobile device 102. Next, the carrier B provisioning system 172 may initiate over-the-air provisioning to apply additional provisioning parameters to the wireless communication identity of the carrier sub-partition, which are exposed to identify the user subscription and device more specifically on the network. It is understood that different carriers that are associated with their particular networks and provisioning systems (e.g. 160, 162 and 170, 172) may accomplish over the air customization in a plurality of ways. In one implementation, the carrier associated with a network (e.g., network B 170) may use OMA-DM provisioning for profile management of provisioning parameters, which may include Access Point Name (APN) information, Mobile Director Number (MDN) information, and other parameters known. In an embodiment, a provisioning system (e.g., 162, 172) may use OMA-DM to send service objects that customize software and firmware and may be based on the active carrier applet on the dynamic SIM 130.

Continuing with the illustration in FIG. 3B, the carrier customization payload (e.g. a message for provisioning that is associated with a wireless communication identity) may be delivered 354 to the mobile device 102 for provisioning the carrier sub-partition and application of branding and configuration of the mobile device 102. It is understood that the content of the delivery to the particular carrier sub-partition (i.e., the provisioning parameters that are used in the dynamic changing of the mobile device 102) determines the user experience of the device—which may include branding, hardware, software, and/or firmware configuration, and interaction capabilities with the corresponding network as previously discussed. The delivered content (which may include the wireless communication identity for the carrier) is applied 356 and populated to the carrier sub-partition that is allocated on the mobile device for the network B 170. A connection with network B 170 using the active carrier applet on the dynamic SIM 130 and the carrier sub-partition may be activated 358 that may finalize dynamic changing of the mobile device 102 for use on network B 170 by implementing the parameters and information associated with the active wireless communication identity.

At block 312, the mobile device 102 conducts wireless communication coupling with the identified mobile communication network based on the partition (i.e., the corresponding carrier sub-partition) allocated to the wireless communication identity, and based on the active carrier applet of the dynamic SIM 130. Thus, the coordination of the dynamic SIM 130 (with the active carrier applet) and corresponding carrier sub-partition on the mobile device 102 allows the mobile device 102 to dynamically change according to any of the specific carrier, network in use, unique identifier of the dynamic SIM 130, and wireless communication identity—while also maintaining multiple subscriptions to other carriers on the same mobile device 102 via a corresponding carrier on the dynamic SIM 130 and carrier sub-partition associated with the other carrier.

It is understood that a plurality of wireless communication identities may be stored in a carrier partition (that may be a trusted security zone), where each has a particular sub-partition that corresponds with one of the plurality of carrier applets on the dynamic SIM 130. Wireless communication identities may associated and used for business, personal, production, testing, association membership, or mobile payment corresponding to use on a particular carrier. For example, a personal wireless communication identity associated with personal wireless communication may be activated responsive to dynamically changing to a carrier sub-partition of the mobile communication device and/or dynamically switching of active carrier applets on a physical dynamic SIM 130, while a business wireless communication identity associated with business wireless communication may be activated responsive to dynamically changing to another partition of the mobile communication device 102 and/or dynamically switching to the corresponding carrier applet of the dynamic SIM 130. Additionally, a wireless communication identity may be activated on the carrier sub-partition of the mobile communication device subsequent to the mobile device 102 dynamically changing, and the mobile device 102 may to point, refer, and/or switch to using that carrier sub-partition. Activation of the wireless communication identity (and thus its corresponding partition) may be based on any of pre-defined preferences, network capabilities, received signal strength, location, and trigger events. A wireless communication identity may further comprise information (e.g. branding information, provisioning parameters from a carrier which are not available on the dynamic SIM 130, user preferences, etc.) that may be used to generate operational runtime parameters for wireless communication coupling of the mobile device 102.

In an embodiment, the wireless communication identities may comprise addresses of alternative domain name server (DNS) servers, media gateways, ports, and/or routing information. Some implementations may allow common information that differs by at least one parameter value to be shared within a holding partition (e.g. 126 of FIG. 1A). An alternative embodiment may include referencing information from the active carrier applet in provisioning, activation, or use of the corresponding wireless communication identity. Additionally, wireless communication identities may comprise user data associated with one of the particular mobile communication networks and carriers, for example user preferences, service enrollment, application enablement, customization parameters that improves mobile communication device use with the network (e.g., that dynamically change firmware, software, and trigger hardware on a mobile device), a contact list, and/or other user data associated with the wireless communication identity. Transfer of particular aspects (e.g., a contact list, voicemail data, usage data, etc.) associated with a particular wireless communication identity can be held in a holding partition (e.g., 126) and written to another wireless communication identity in another sub-partition without either sub-partition gaining access to the sensitive contents, parameters, and information of the particular sub-partition that was not released to the holding partition. This may allow sharing of designated information (such as designations by a user and/or carrier) among the wireless communication identities without exposing sensitive information particular to each carrier and carrier sub-partition.

In an embodiment, a mobile device 102 disclosed herein may be considered a base device that is initially unbranded and thus generic with respect to a particular carrier. This means that the base device is a specialized device comprising at least some elements and/or features yet to be fully provisioned (or branded) with some information, and may not necessarily be limited to wireless functionality only with a particular wireless carrier. Thus, the base device may operate with a plurality of different wireless communications service providers having different wireless communications technologies.

Figure 4:
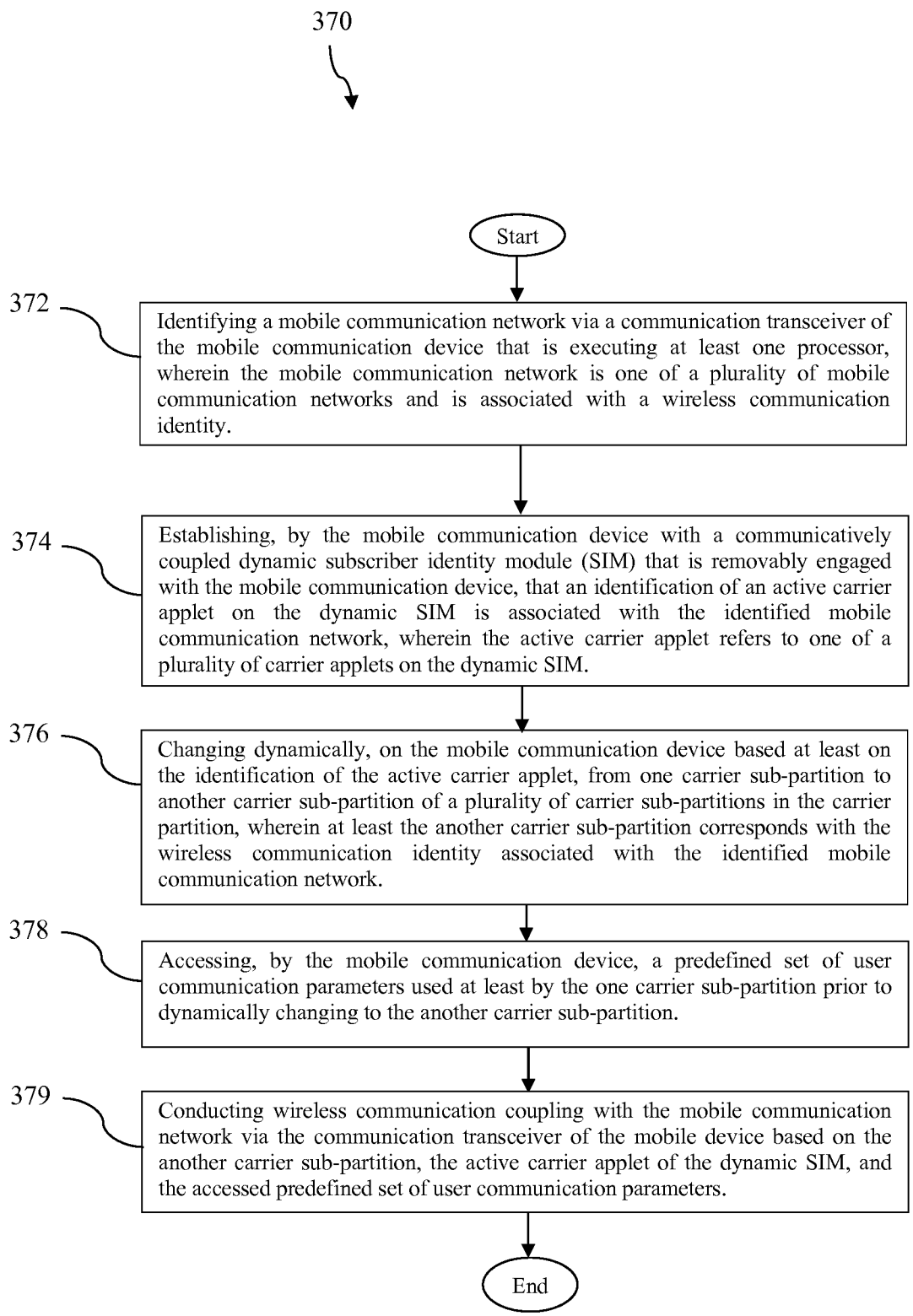
FIG. 4 is a flow chart illustrating a method according to an embodiment of the disclosure.

Turning now to FIG. 4, a method 370 is described according to an embodiment. It is understood that embodiments of system 100 disclosed in FIG. 1A and FIG. 1B may implement embodiments of any of the methods described herein. At block 372 a mobile communication network is identified on a mobile device 102. The mobile communication network may be one of a plurality of mobile networks, with each mobile communication network being associated with an individual wireless communication identity for the mobile device 102. The mobile device 102 may comprise two or more wireless communication identities that are each allocated into their partition of a memory of the mobile communication device (such as carrier sub-partitions 120, 122, 124) as previously disclosed herein.

At block 374, the mobile device 102 (e.g. via configuration of a processor by the carrier application 118*a*) establishes that an identification of the active carrier applet on the dynamic SIM 130—which is communicatively coupled and removably engaged with the mobile device 102—is associated with the identified mobile communication network. The active carrier applet corresponds with one of a plurality of carrier applets that may be simultaneously maintained in memory on the dynamic SIM 130 and may be provisioned without overwriting and/or erasing the plurality of carrier applets. Each carrier applet of the dynamic SIM 130 may correspond with at least one wireless communication identity on the mobile device 102, which in turn is associated with a mobile communication network and one partition of the mobile device 102.

At least part of each wireless communication identity is stored in a particular partition (e.g., carrier sub-partition 120, 122, 124) in the memory 110 of the mobile communication device 102. Different wireless communication identities may be allocated, stored, and installed in different manners. For example, the wireless communication identities may be loaded at the original equipment manufacturer (OEM) of the mobile communication device when the original equipment manufacturer knows where the mobile communication device will be shipped to and/or what wireless communication identities may be desired on the mobile device 102. Alternatively, this may be done later on by an application on the mobile device 102 (e.g., carrier application 118*a*) and/or a remote server at the time of fulfillment or activation of the mobile device.

A wireless communication identity may be allocated and stored on the mobile communication device first (such as in carrier sub-partition A 120) and then installed and/or activated by an application (e.g., carrier application 118*a*) on the mobile communication device when the mobile communication device dynamically changes to the corresponding carrier sub-partition associated with wireless communication identity from a previous active wireless communication identity (i.e. deactivates the wireless communication identity from another carrier sub-partition such as carrier sub-partition B 122 and activates a new carrier sub-partition). Additionally, a wireless communication identity may be dynamically received, allocated, and installed by the application on the mobile communication device when the mobile device 102 changes to activate the particular sub-partition associated with the wireless communication identity. Switching which carrier applet is active on the dynamic SIM 130 (i.e., making a different carrier applet the active carrier applet without decoupling the dynamic SIM from the mobile device) may also trigger a wireless communication identity to be dynamically allocated (to a particular partition), installed, and/or activated on the mobile device 102. It is understood that each carrier applet of the dynamic SIM 130 comprises and references a unique identifier that may be associated with one of the mobile networks.

In some embodiments a triggering event is detected. In an embodiment, a triggering event may trigger the change of wireless communication identities and/or carrier applets on the dynamic SIM 130. An application on the mobile device 102 (e.g., carrier application 118*a*) may execute an active carrier engine having rules or functions to determine what wireless communication identity is active for wireless communications on the active carrier sub-partition. In some implementations, the mobile device 102 may provide a user interface 106 on a display that provides controls for a user to select from among the available wireless communication identities on the mobile device 102 to make active. Alternatively, a wireless communication identity may be activated by a server associated with the carrier of the identified mobile communication network.

Additionally, in an embodiment, an application (e.g., any of device applications 112 and carrier applications 118a of FIG. 1A) may monitor operational conditions and/or environmental conditions and determine triggering events. The application may activate a wireless communication identity when a triggering event is detected. Triggering events may comprise receiving user inputs, triggering based on a schedule or geolocation, server based, switching carrier applets on the dynamic SIM 130, and/or the identification of the active carrier applet on the dynamic SIM 130. Triggering events may be based on locations, time and schedules, radio signal incidents, requests, and other triggering events. Different wireless communication identities on the mobile device 102 and/or carrier applet on the dynamic SIM 130 may be activated by different triggering events. For example, one wireless communication identity may be activated by a single triggering event and another wireless communication identity may be activated only by a different triggering event, or by a combination of multiple triggering events. The application may provide a graphical user interface on a display that provides user defined mapping, selection, and/or association for use of particular memory sub-partitions and corresponding wireless communication identities stored therein. In some embodiments, a wireless communication identity, memory partition (e.g. 143, 145, 147) on the dynamic SIM 130, and/or carrier applet may be dynamically changed, updated, and/or activated without reception of user input on mobile device 102, such as through receiving over-the-air commands.

At block 376, the mobile device 102 is changed dynamically from one carrier sub-partition to another. The changing of partitions may be based on a trigger event, such as the identification of the active carrier applet on the dynamic SIM 130. One of the wireless communication identities stored in the partitions of the memory 110 is activated or dynamically installed and activated (and may be in response to the triggering event), where the mobile device 102 conducts wireless communication via the communication transceiver 104 based on the active communication identity. Thus, when the mobile device 102 dynamically changes carrier partitions (which may be trusted secure partitions), the wireless communication identity associated with the carrier sub-partition is activated.

Based on the triggering event and/or a corresponding rule to select the optimal or preferred wireless communication identity to activate, the selected wireless communication identity may be activated or dynamically installed then activated by the application (e.g., carrier application 118a) on its corresponding partition of the mobile device 102. When the installation of a new wireless communication identity is involved, a partition in the memory 110 is allocated to store the wireless communication identity and the wireless communication identity is installed into the partition of the mobile device 102 and then activated. The application (re)determines or (re)calculates operational run-time parameters of the mobile device 102 based on the activated wireless communication identity and store these operational run-time parameters in the memory 110 of the mobile device 102. Dynamic changing on the mobile device 102 may then cause the communication transceiver 104 to reset, thus bringing the recalculated operational run-time parameters into effect. Dynamic changing of the mobile device 102 and activation of wireless communication identity may deactivate software and/or firmware of the one partition (i.e., the partition and wireless communication identity previously activated) and activates firmware (e.g., through associated brand information of the wireless communication identity) corresponding to the another trusted secure partition (i.e., the wireless identity corresponding to the newly activated partition) and thus may improve the mobile device's functionality when coupled with the associated network (e.g., as previously discussed through deactivation of unused and/or inefficient use of hardware, firmware, and/or software).

At block 378, the mobile device 102 may access a predefined set of user communication parameters that is be associated with the wireless communication identity of the currently active carrier sub-partition. In an embodiment, the predefined set of user communication parameters may be used by another partition (e.g. another carrier sub-partition) that was active prior to dynamically changing and activating the particular partition and wireless communication identity. User data associated with the selected and/or activated wireless communication identity may also be updated and stored based on user input and/or via over-the-air communications. For example, the previous corresponding user data may be replaced by the new user data. Corresponding applications may then operate with the updated user data and/or user communication parameters.

User communication parameters (e.g., user data) may comprise any of a predefined history of communication activity on the mobile device 102 (whose activity may be specific with at least one of the plurality of mobile communication networks), user contact/address profile list, voicemail recordings, voice message data, and text messaging data. In some embodiments, at least a subset of user communication parameters may be transferable among the plurality of partitions. For example, a user may want to dynamically change the mobile communication device 102 from carrier A to carrier B, however the user may want continue access to prior communication activity information. An application of the mobile device 102 (e.g., the carrier application 118a) may transfer at least some user communication parameters to a holding partition (e.g., 126) responsive to receiving indication that a different carrier sub-partition (and thus different wireless carrier identity) is being activated. The newly activated partition on the mobile device 102 may then access and receive the transferable user communication parameters (user data), and then add the transferred user communication parameters to the newly activated wireless communication identity. Thus, the mobile device 102 may operate on the identified network of carrier B (by using the associated wireless communication identity and carrier applet that are now active) while also retaining communication activity information when mobile device 102 was operating on carrier A (with associated wireless communication identity and carrier applet that were previously active). In an embodiment, this may be accomplished via steering applet 141 operating with communication runtime framework 132 and/or carrier application 118a.

In some implementations, a carrier application may send at least one wireless communication identity (corresponding to a specific carrier's wireless communication configurations, device rules, and/or associated user data) to a remote server. The carrier application may fetch and/or poll a remote server (e.g., carrier provisioning systems 162, 172, etc.) for a wireless communication identity, corresponding wireless communication configurations, device rules, and/or associated user data from the remote server with which those data are stored under predefined circumstances. For example, when a mobile device 102 is lost, the user may get a new mobile communication device and download the stored data (e.g., wireless communication identities, transferred user communication parameters, etc.) from a remote server to the particular sub-partitions of the new mobile communication device and also dynamically receive corresponding carrier applets to a replacement dynamic SIM (based on the wireless communication identities) without requiring user input and/or prompting.

At block 379, the mobile device 102 conducts wireless communication coupling with the identified mobile communication network based on and using the corresponding activated trusted secure partition (e.g. the activated carrier sub-partition), the active carrier applet of the dynamic SIM 130, and the accessed predefined set of user communication parameters.

Figure 5:
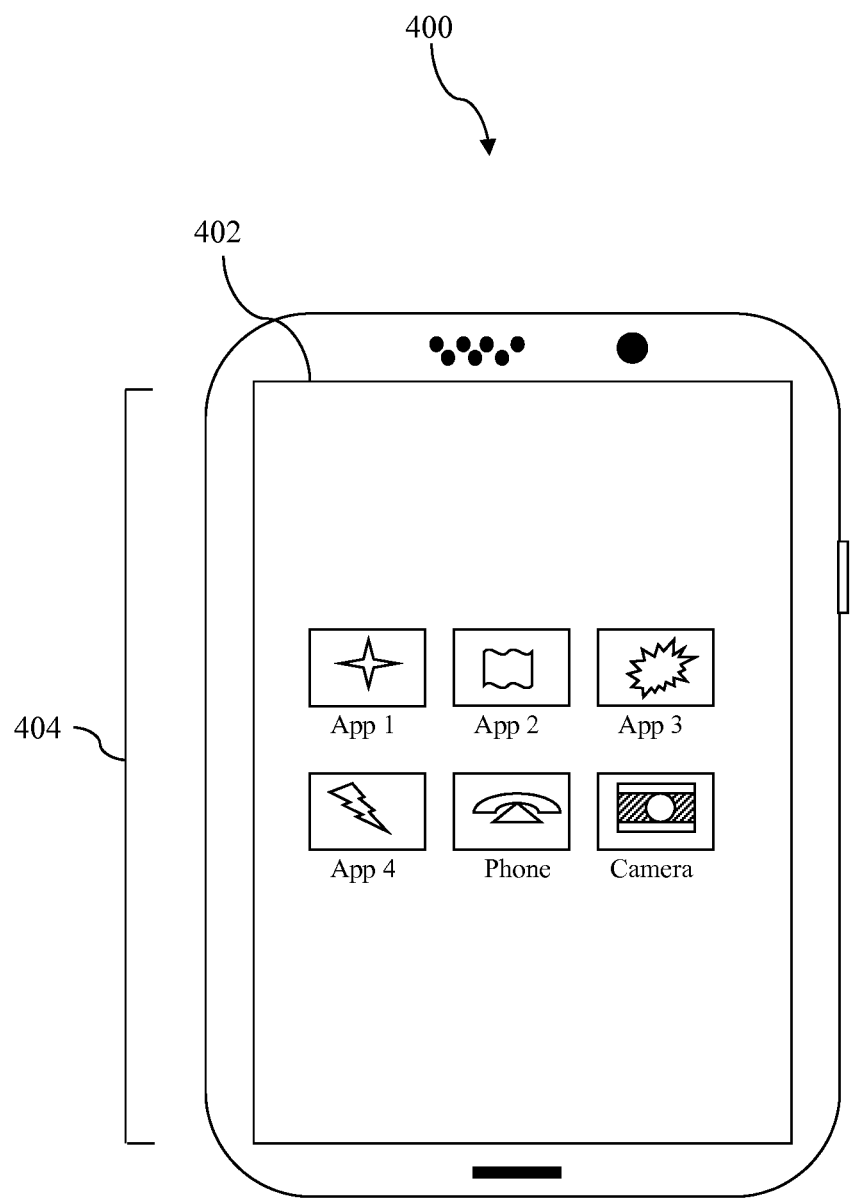
FIG. 5 is an illustration of a mobile communication device according to an embodiment of the disclosure.

FIG. 5 depicts a user equipment (UE) 400, which is operable for implementing aspects and embodiments of the present disclosure—such as mobile communication device 102 disclosed in at least FIG. 1A—but the present disclosure should not be limited to these implementations. Though illustrated as a mobile phone, the user equipment 400 may take various forms including a wireless handset, a pager, a tablet, a personal digital assistant (PDA), a laptop computer, enterprise access terminal, compact flash devices, product device scanners, a gaming device, wearable computer, wearable devices (e.g., smart watches, smart glasses), and/or a media player. Embodiments of user equipment (e.g., 400, 102) may be mobile or stationary (i.e., intended for use at a designated location), and may communicate with a network (e.g., a radio access network (RAN), core network, intranet, internet, enterprise network, VPN, etc.). The UE 400 includes a display 402 and a touch-sensitive surface and/or keys 404 for input by a user; however, alternate embodiments of a display 402 may not be touch-sensitive. Although a predefined number of application icons 404 are illustrated within the touch screen display 402, it is understood that in different embodiments, any number of application icons 404 may be presented via the touch screen display 402. Application icons may correspond to hardware, software, and/or firmware applications that may execute locally on a processor or UE 400 or remotely on a processor of a network. In some embodiments, a user may use UE 400 to initiate, receive, download, and/or install additional applications on the UE 400, and an icon associated with such downloaded and/or installed applications may be added to the touch screen display 402, an alternative user-interface of display 402, or an alternate screen (not shown). The UE 400 may present other options for the user to select, controls for the user to actuate, and/or cursors or other indicators for the user to direct. The UE 400 may further accept data entry from the user, including numbers to dial or various parameter values for configuring the operation of the handset.

The UE 400 may further execute one or more software or firmware applications in response to user commands, or other triggers (both local or remote). These applications may configure at least a processor of the UE 400 to perform various customized functions in response to user interaction and thus can transform the UE 400 into a specialized machine. Additionally, the UE 400 may be programmed and/or configured over-the-air or via wired coupling, for example from a wireless base station, a wireless access point, or a peer UE 400. The UE 400 may access portal and/or execute a web browser application which enables the touch screen display 402 to show content (e.g., remote content of a web page via a communication portal). Data packets (e.g., content from the web page) may be obtained on the UE 400 via wired and/or wireless communications, such as by linking to a base transceiver station (e.g., associated with any wireless communication technologies such as GSM, CDMS, LTE, Node B, enhanced Node B, etc.), a wireless network access node (e.g., a routing device), a peer UE 400, or any other wireless communication network or network system of a communication service provider.

Figure 6:
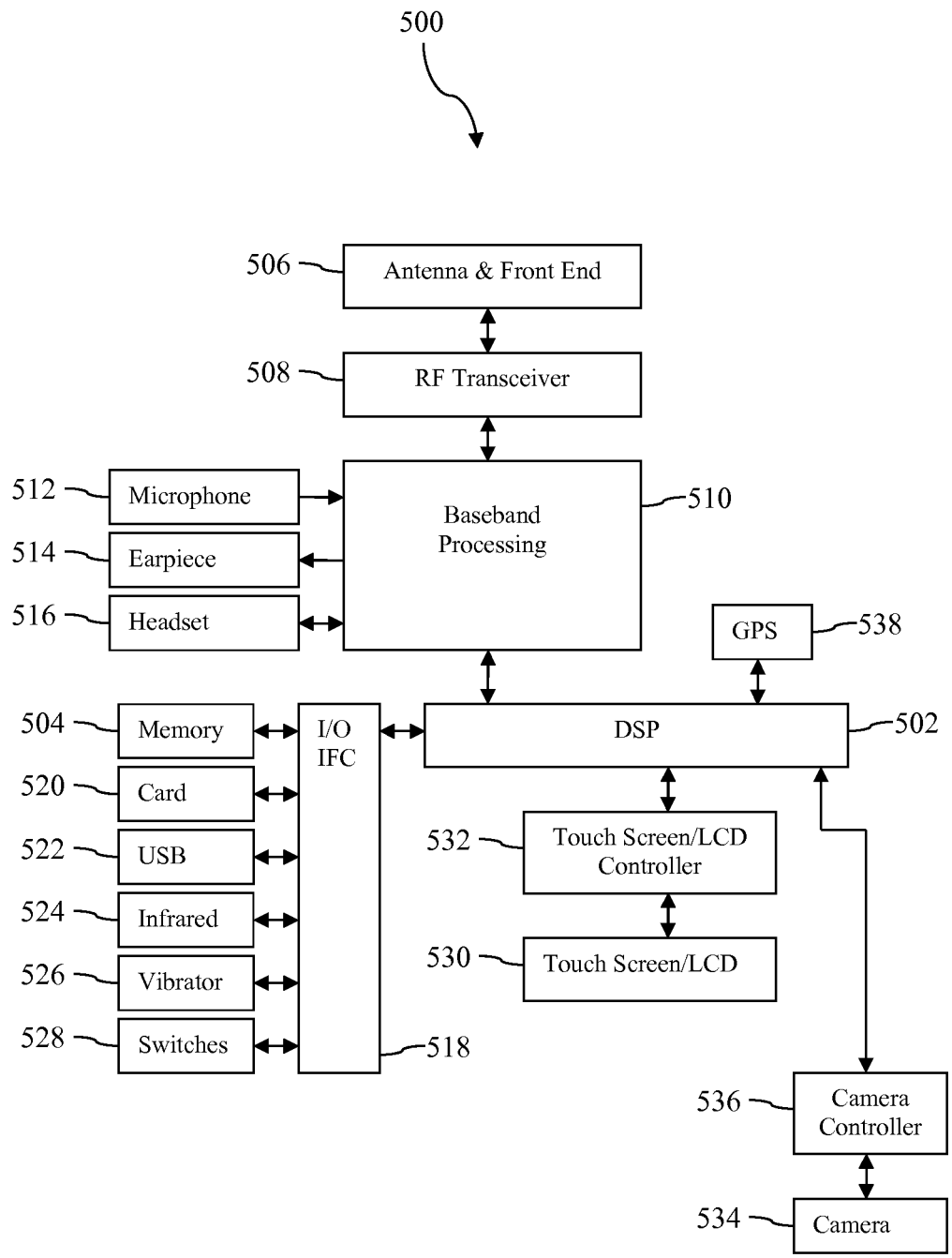
FIG. 6 is a block diagram of a mobile communication device according to an embodiment of the disclosure.

FIG. 6 shows a block diagram 500 that is operable with embodiments of UE 400. While a variety of known components of handsets are depicted, in an embodiment a subset of the listed components and/or additional components not listed may be included in the UE 400. The UE 400 includes a digital signal processor (DSP) 502 and a memory 504 (e.g., a non-transitory and/or non-volatile memory). As shown, the UE 400 may further include an antenna and front end unit 506, a radio frequency (RF) transceiver 508 (e.g., communication transceiver of mobile device 102, or other air interface device), a baseband processing unit 510, a microphone 512 (i.e., an input receiving port), an earpiece speaker 514, a headset port 516 (i.e., output signaling port), an input/output interface 518, a removable card 520 (e.g., removable memory, UICC, dynamic SIM 130, etc.) and associated interface (e.g. reader interface 128), a port 522 (e.g., a universal serial bus (USB), or other electrical port to receive data and/or electric field), an infrared port 524, a vibrator 526 (i.e., an electro-mechanical actuation mechanism), electro-mechanical switches 528, a touch screen display (e.g., a liquid crystal display (LCD), light emitting diode, etc.) with a touch sensitive surface 530 (i.e., sensitive to input touch and/or non-contact gestures), a touch screen/LCD controller 532, a camera 534, a camera controller 536, and a global positioning system (GPS) receiver 538. In an embodiment, the UE 400 may include another kind of display that does not provide a touch sensitive screen. In an embodiment, the DSP 502 may communicate directly with the memory 504 without passing through the input/output interface 518. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide network connectivity (e.g., internet, intranet, extranet, etc.), enabling a UE to gain access to and/or receive content via the network (e.g., to send and receive e-mail over the internet, text messages over a wireless network, other data packets). The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 couples to the DSP 502 via the input/output interface 518 to provide at least one mechanism for the user to make selections, enter information, and otherwise provide input to the UE 400. Another input mechanism may be the touch screen LCD 530, which may also display text and/or graphics to the user via a user-interface. The touch screen display is not limited to liquid crystal, but may include other display mechanisms such as LED, OLED, wearable display, and the like. It is understood that touch screen display 530 may not necessarily be limited to receiving input via touch, but may also include gesture recognition via coupling to other components (e.g., 534, 536, etc.). The touch screen LCD controller 532 couples the DSP 502 to the touch screen LCD 530. The GPS receiver 538 is coupled to the DSP 502 to decode global positioning system signals, thereby enabling the UE 400 to determine its position.

Figure 7A:
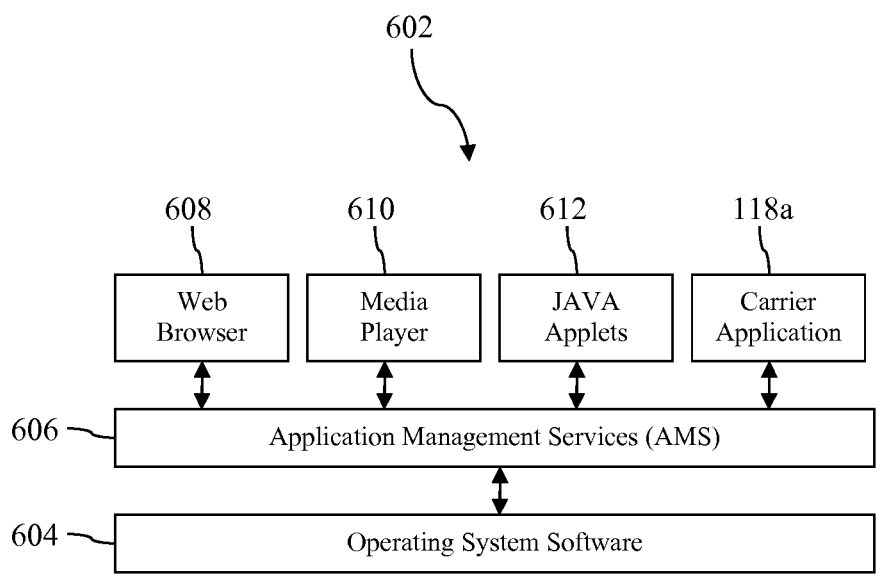
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audio-visual media. The JAVA applets 612 may be executed by the UE 400 to provide a variety of functionality including games, utilities, and other functionality. In an embodiment, the carrier application 118*a* may interact with AMS 606 and manage dynamic changing of the mobile device 102 by retrieving, installing, changing, and/or activating firmware particular to a wireless communication identity associated with a carrier. Various applications, such as the carrier application 118*a*, may also interact with certain application frameworks, e.g. 624 (shown in FIG. 7A), in sending/receiving messages and data packets to a UE 400 and/or the dynamic SIM 130 of FIGS. 1A and 1B.

Figure 7B:
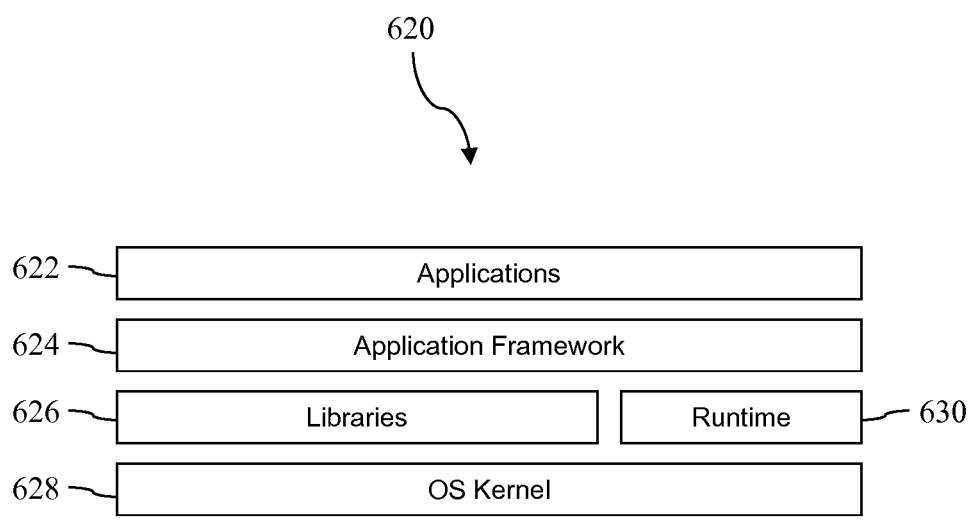
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 (e.g., device applications 112 illustrated in FIG. 1A) that may execute in the execution runtime 630 and may rely upon services provided by the application framework 624. Applications 622 and the application framework 624 may rely upon functionality provided via the libraries 626. In an embodiment, at least one of the applications 622 may be a carrier application 118*a* that promotes dynamic changing and installation of firmware that at least brands the mobile communication device according to the particular wireless communication identity associated with a carrier.

Figure 8:
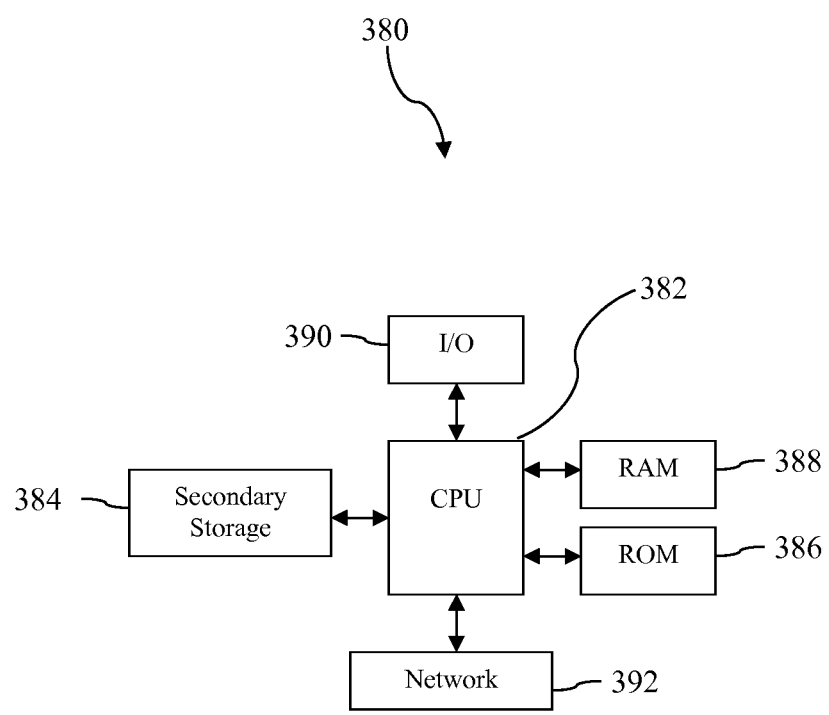
FIG. 8 is a block diagram of a computer system according to an embodiment of the disclosure.

FIG. 8 illustrates a computer system 380 that is suitable for implementing one or more embodiments disclosed herein such as, but not limited to, 150, 162, 172, and 180. The computer system 380 includes a processor 382 (which may be referred to as a central processor unit or CPU) that is communicatively coupled and in communication with memory devices including secondary storage 384, read only memory (ROM) 386, random access memory (RAM) 388, input/output (I/O) devices 390, and network connectivity devices 392. The processor 382 may be implemented as one or more CPU chips. A computer system 380 may communicate with a network, such as with a core network via a RAN, and through the core network the computer system can be connected with external networks such as the Internet. Of course, other mechanisms of connecting to a network (e.g., the core network, RAN, LAN, and/or the Internet) are also possible for the computer system 380, such as over wired access networks, WiFi networks (e.g., based on IEEE 802.11, etc.) and so on. Computer system 380 can be embodied by any of a number of types of devices discussed herein.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers, and/or CPUs. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise (e.g., a service provider) as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of dynamically changing a mobile communication device by communicative coupling with a dynamic subscriber identity module (SIM), the method comprising:
   identifying, via a communication transceiver of the mobile communication device that is executing at least one processor, a mobile communication network that corresponds with at least one of a plurality of carrier sub-partitions of a carrier partition in a non-transitory memory of the mobile communication device;
   polling, by the mobile communication device from the dynamic SIM executing at least one logical processor and that is removably engaged with the mobile communication device, an identification of an active carrier applet on the dynamic SIM, wherein one of a plurality of carrier applets is the active carrier applet;
   changing dynamically, on the mobile communication device in response to a trigger event, from one carrier sub-partition to another carrier sub-partition, wherein at least the one carrier sub-partition and the another carrier sub-partition each correspond with a different wireless communication identity;
   confirming, by the mobile communication device based on the dynamic SIM, that the identification of the active carrier applet is associated with the corresponding wireless communication identity that is unique to the another carrier sub-partition;
   activating the corresponding wireless communication identity of the another carrier sub-partition based on the confirmation; and
   conducting wireless communication coupling with the mobile communication network via the communication transceiver of the mobile device based on activating the corresponding wireless communication identity and the active carrier applet of the dynamic SIM.

2. The method of claim 1, wherein the trigger event comprises at least one of:
   a user input received on a user interface of the mobile device;
   a determination that the identification of the active carrier applet is not associated with the corresponding wireless communication identity of the one carrier sub-partition; and
   a network server triggered event that is associated with at least one of a location of the mobile communication, a scheduled event, or switching the identification of the active carrier applet of the dynamic SIM while retaining the plurality of carrier applets.

3. The method of claim 1, wherein the dynamic SIM comprises a plurality of memory partitions that each correspond with one of the plurality of carrier applets, and an integrated circuit that is communicatively coupled with the mobile communication device.

4. The method of claim 1, wherein the dynamic SIM transmits at least the identification of the active carrier applet on the dynamic SIM to the mobile communication device in response to the polling.

5. The method of claim 4, further comprising directing, via a steering applet of the dynamic SIM, the dynamic SIM to switch the active carrier applet to another carrier applet of the plurality of dynamic SIM applets, wherein directing suspends the previously active carrier applet from active use on the dynamic SIM and maintains storage of the previously active carrier applet on the dynamic SIM.

6. The method of claim 5, further comprising, subsequent to the another carrier applet on the dynamic SIM becoming the active carrier applet, receiving, by the mobile communication device from the dynamic SIM, an identification of the another carrier applet, wherein confirming the identification from the dynamic SIM is based on the identification of the another carrier applet that is the active carrier applet on the dynamic SIM.

7. The method of claim 1, wherein the active carrier applet on the dynamic SIM is maintained in parallel on the dynamic SIM with at least another carrier applet that is not in active use on the dynamic SIM, and wherein each of the plurality of carrier applets is associated with enabling wireless communication coupling on a corresponding wireless communication network.

8. The method of claim 1, wherein the mobile communication device conducts wireless communication coupling with a plurality of wireless communications service providers that use a plurality of wireless technologies via a plurality of wireless communication networks in a plurality of localities, and wherein conducting wireless communication coupling with one of the plurality of wireless communication providers is based on the corresponding active carrier applet of the dynamic SIM being used in conjunction with the associated carrier sub-partition of the carrier partition in the non-transitory memory of the mobile communication device.

9. A method of dynamically changing a mobile communication device by communicative coupling with a dynamic subscriber identity module (SIM), the method comprising:
identifying a mobile communication network via a communication transceiver of the mobile communication device executing at least one processor, wherein the mobile communication network is one of a plurality of mobile communication networks and is associated with a wireless communication identity;
polling, by the mobile communication device from the dynamic SIM that is removably engaged with the mobile communication device, an identification of an active carrier applet on the dynamic SIM, wherein the active carrier applet is a first carrier applet stored in one of a plurality of memory partitions of the dynamic SIM;
switching the active carrier applet on the dynamic SIM from the first carrier applet to another carrier applet, wherein the another carrier applet stored in another of the plurality of memory partitions of the dynamic SIM is associated with the identified mobile communication network;
based on switching the active carrier applet to the another carrier applet, analyzing whether a corresponding carrier sub-partition is in a carrier partition of a non-transitory memory of the mobile communication device and is associated with the wireless communication identity;
responsive to an analysis that the wireless communication identity is not associated with any corresponding carrier sub-partition, allocating, by the mobile communication device, one of a plurality of carrier sub-partitions in the carrier partition to the wireless communication identity; and
conducting wireless communication coupling with the mobile communication network via the communication transceiver of the mobile device based on the carrier sub-partition allocated to the wireless communication identity and the active carrier applet that is the another carrier applet of the dynamic SIM.

10. The method of claim 9, wherein at least one carrier applet of a plurality of carrier applets on the dynamic SIM comprises a unique identifier and specific communication network credentials that enable communicative coupling with one of the plurality of mobile communication networks.

11. The method of claim 10, wherein switching the active carrier applet maintains parallel storage of the plurality of carrier applets that each correspond with a particular memory partition of the dynamic SIM, the mobile communication device references the unique identifier that is associated with active carrier applet based on the switching.

12. The method of claim 10, further comprising determining whether the dynamic SIM comprises at least one carrier applet of the plurality of carrier applets that corresponds with the identified mobile communication network.

13. The method of claim 12, further comprising:
responsive to a determination that dynamic SIM does not comprise the at least one carrier applet corresponding with the identified mobile communication network:
receiving, from a server via the communication transceiver of the mobile communication device, the another carrier applet that corresponds with the identified mobile communication network; and
storing the another carrier applet in a particular memory partition of the dynamic SIM without erasing the first carrier applet that is the active carrier applet.

14. The method of claim 13, wherein switching the active carrier applet is subsequent to storage of the another carrier applet on the dynamic SIM.

15. The method of claim 9, further comprising provisioning, on the dynamic SIM, at least one of the plurality of carrier applets with a carrier provisioning payload received from a carrier provisioning server, wherein the at least one carrier applet is provisioned without erasing a different carrier provisioning payload corresponding to at least one of the plurality of carrier applets.

16. The method of claim 9, wherein switching is based on a trigger event, the trigger event comprising any of: reception of a user input that indicates use of the identified mobile communication network; a determination that the identification of the active carrier applet is not associated with the corresponding wireless communication identity of the one carrier sub-partition; an identified location of the mobile communication device; a scheduled event associated with the mobile communication device; and initiation, via the mobile communication device, of a steering payload received on the dynamic SIM that switches the active carrier applet on the dynamic SIM.

17. A method of dynamically changing a mobile communication device by communicative coupling with a dynamic subscriber identity module (SIM), the method comprising:
identifying a mobile communication network via a communication transceiver of the mobile communication device that is executing at least one processor, wherein the mobile communication network is one of a plurality of mobile communication networks and is associated with a wireless communication identity;
establishing, by the mobile communication device with the communicatively coupled dynamic SIM that is removably engaged with the mobile communication device, that an identification of an active carrier applet on the dynamic SIM is associated with the identified mobile communication network, wherein the active carrier applet refers to one of a plurality of carrier applets on the dynamic SIM;
changing dynamically, on the mobile communication device based at least on the identification of the active carrier applet, from one carrier sub-partition to another carrier sub-partition of a plurality of carrier sub-partitions in the carrier partition, wherein at least the another carrier sub-partition corresponds with the wireless communication identity associated with the identified mobile communication network;
accessing, by the mobile communication device, a predefined set of user communication parameters used at least by the one carrier sub-partition prior to dynamically changing to the another trusted secure partition; and
conducting wireless communication coupling with the mobile communication network via the communication transceiver of the mobile device based on the another carrier sub-partition, the active carrier applet of the dynamic SIM, and the accessed predefined set of user communication parameters.

18. The method of claim 17, further comprising
responsive to a trigger event, switching the active carrier applet to one of a plurality of carrier applets based on the one carrier applet being associated with the identified mobile communication network,
wherein switching the active carrier applet maintains parallel storage of the plurality of carrier applets that each correspond with a unique memory partition of the dynamic SIM, the active carrier applet references a unique identifier received on the dynamic SIM based on the corresponding carrier applet.

19. The method of claim 17, wherein changing dynamically deactivates firmware of the one carrier sub-partition and activates carrier firmware corresponding to the another carrier sub-partition; and wherein each of the carrier applets on the dynamic SIM correspond with one of the plurality of mobile communication networks.

20. The method of claim 17, wherein the predefined set of user communication parameters is transferable among the plurality of carrier sub-partitions and associated with a previously active wireless communication identity, the predefined set of user communication parameters comprises at least two of: a predefined history of communication activity on the mobile communication device associated with at least one of the plurality of mobile communication networks, user contact profile list, voice message data, and text messaging data.

\* \* \* \* \*